(12) United States Patent
Kim et al.

(10) Patent No.: US 12,111,997 B2
(45) Date of Patent: Oct. 8, 2024

(54) ELECTRONIC DEVICE TO DETECT INPUT BASED ON A CAPACITANCE CHANGE AND INPUT OF AN INPUT DEVICE

(71) Applicant: Samsung Display Co., Ltd., Yongin-si (KR)

(72) Inventors: Chul Kim, Yongin-si (KR); Yun-Ho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/103,360

(22) Filed: Jan. 30, 2023

(65) Prior Publication Data

US 2023/0333692 A1      Oct. 19, 2023

(30) Foreign Application Priority Data

Apr. 15, 2022    (KR) .................... 10-2022-0047102

(51) Int. Cl.
*G06F 3/041*  (2006.01)
*G06F 3/044*  (2006.01)
*G06F 3/046*  (2006.01)

(52) U.S. Cl.
CPC ........ *G06F 3/04182* (2019.05); *G06F 3/0446* (2019.05); *G06F 3/046* (2013.01); *G06F 2203/04106* (2013.01)

(58) Field of Classification Search
CPC .... G06F 3/0412; G06F 3/046; G06F 3/04182; G06F 3/0446; G06F 3/04166; G06F 2203/04106
See application file for complete search history.

(56) References Cited

U.S. PATENT DOCUMENTS

| 8,063,322 | B2 | 11/2011 | Katsurahira |
| 10,788,923 | B2 | 9/2020 | Kong |
| 11,144,148 | B2 | 10/2021 | Kim et al. |
| 2014/0078104 | A1* | 3/2014 | Lee ................... G06F 3/0446 345/174 |

FOREIGN PATENT DOCUMENTS

| KR | 10-2019-0079369 A | 7/2019 |
| KR | 10-2020-0141850 A | 12/2020 |

\* cited by examiner

*Primary Examiner* — Yaron Cohen
(74) *Attorney, Agent, or Firm* — Lewis Roca Rothgerber Christie LLP

(57) ABSTRACT

An electronic device includes: a display layer; a sensor layer on the display layer, and including: a first electrode, and a second electrode adjacent to the first electrode; and a plurality of crossing electrodes; and a driving circuit electrically connected to the sensor layer to control an operation of the sensor layer. The sensor layer is to operate in a first touch mode to sense a first input signal, and a second touch mode to sense a second input signal of an input device to discharge a magnetic field, and the driving circuit is to sense coordinates of the input device based on a signal profile measured based on a first current having a first current direction formed in the first electrode by the input device, and a second current having a second current direction opposite to the first current direction formed in the second electrode by the input device.

20 Claims, 27 Drawing Sheets

ELECTRONIC DEVICE TO DETECT INPUT BASED ON A CAPACITANCE CHANGE AND INPUT OF AN INPUT DEVICE

CROSS-REFERENCE TO RELATED APPLICATIONS

This application claims priority to and the benefit of Korean Patent Application No. 10-2022-0047102, filed on Apr. 15, 2022, in the Korean Intellectual Property Office, the entire disclosure of which is incorporated by reference herein.

BACKGROUND

1. Field

Aspects of embodiments of the present disclosure relate to an electronic device that calculates coordinates of an input device.

2. Description of the Related Art

Multimedia electronic devices, such as a television (TV), a cellular phone, a tablet computer, a navigation system, and a game console, include an electronic device that displays an image. Electronic devices may include an input sensor that provides a touch-based input manner for enabling a user to input information and/or a command intuitively, conveniently, and easily, in addition to a general input manner, such as a button, a keyboard, or a mouse.

The input sensor may sense a touch and/or pressure using a body part of a user. Meanwhile, demand for employing a pen to input a fine touch input has been increasing for those users familiar with inputting information using a writing instrument, and/or for interacting with a specific application program (e.g., an application for a sketch or a drawing).

The above information disclosed in this Background section is for enhancement of understanding of the background of the present disclosure, and therefore, it may contain information that does not constitute prior art.

SUMMARY

Embodiments of the present disclosure are directed to an electronic device having improved performance in calculating coordinates of an input device.

According to one or more embodiments of the present disclosure, an electronic device includes: a display layer; a sensor layer on the display layer, and including: a plurality of electrodes including a first electrode, and a second electrode adjacent to the first electrode; and a plurality of crossing electrodes; and a driving circuit electrically connected to the sensor layer, and configured to control an operation of the sensor layer. The sensor layer is configured to operate in a first touch mode to sense a first input signal based on a capacitance change, and a second touch mode to sense a second input signal of an input device configured to discharge a magnetic field, and the driving circuit is configured to sense coordinates of the input device based on a signal profile, the signal profile being measured based on a first current having a first current direction formed in the first electrode by the input device, and a second current having a second current direction opposite to the first current direction formed in the second electrode by the input device.

In an embodiment, the driving circuit may include an analog front end including: an amplifier configured to amplify the first input signal and the second input signal; and a filter configured to remove noise from a signal output from the amplifier.

In an embodiment, the analog front end may further include: a sample and hold circuit configured to perform a sample and hold operation on a signal output from the filter.

In an embodiment, the amplifier may include: an inverting input terminal connected to the first electrode; and a non-inverting input terminal connected to the second electrode.

In an embodiment, the amplifier may include: an inverting input terminal connected to the first electrode; and a non-inverting input terminal connected to a reference potential.

In an embodiment, the second input signal may include a position signal and a data signal, and the driving circuit may further include a sync controller connected to the analog front end. The sync controller may include: a sync data providing circuit configured to provide a sync signal that is inverted to the position signal; an XOR gate connected to the analog front end and the sync data providing circuit, the XOR gate being configured to perform a XOR operation based on the position signal and the sync signal; and a sync determining circuit configured to determine a synchronization state of the second input signal, based on a result of the XOR operation.

In an embodiment, the driving circuit may include: a first analog front end configured to receive the first input signal; a second analog front end configured to receive the second input signal; and a switching circuit configured to select one of the first analog front end and the second analog front end.

In an embodiment, the first current in the signal profile may have a negative value, and the second current in the signal profile may have a positive value. The driving circuit may be configured to calculate the coordinates of the input device based on a zero-crossing value of the signal profile.

In an embodiment, the driving circuit may be configured to: calculate a first signal profile by changing a sign of a portion of the signal profile; calculate a second signal profile by rotating the first signal profile, such that the second signal profile is symmetrical to the first signal profile about a first axis; and calculate the coordinates of the input device, based on a peak value of the second signal profile.

In an embodiment, the driving circuit may be configured to: calculate a plurality of signal profiles; calculate a superimposed signal profile by adding the plurality of signal profiles; change a sign in the superimposed signal profile; and calculate the coordinates of the input device, based on a peak value of a value symmetrical about the first axis.

In an embodiment, the plurality of electrodes may further include: a third electrode interposed between the first electrode and the second electrode; and a fourth electrode interposed between the first electrode and the third electrode. The driving circuit may be configured to: calculate a first differential signal profile measured based on the first electrode and the third electrode; and calculate the coordinates of the input device, based on a zero-crossing value of the first differential signal profile.

In an embodiment, the driving circuit may be configured to: calculate a second differential signal profile by changing a sign of a portion of the first differential signal profile; and calculate the coordinates of the input device, based on a peak value of the second differential signal profile.

In an embodiment, the driving circuit may be configured to: calculate a fourth differential signal profile measured based on the third electrode and the fourth electrode; and calculate the coordinates of the input device, based on a peak value of the fourth differential signal profile.

In an embodiment, the driving circuit may be configured to: calculate a fifth differential signal profile by changing a sign of a portion of the fourth differential signal profile; and calculate the coordinates of the input device, based on a zero-crossing value of the fifth differential signal profile.

According to one or more embodiments of the present disclosure, an electronic device includes: a display layer; a sensor layer on the display layer, the sensor layer being configured to operate in a first touch mode to sense a first input signal based on a capacitance change, and a second touch mode to sense a second input signal of an input device configured to discharge a magnetic field; and a driving circuit electrically connected to the sensor layer to control an operation of the sensor layer. The driving circuit includes: an analog front end configured to convert an analog signal of the second input signal into a digital signal; and a sync controller connected to the analog front end. The sync controller includes: a sync data providing circuit configured to provide a sync signal that is inverted to a position signal of the second input signal; an XOR gate connected to the analog front end and the sync data providing circuit, the XOR gate configured to perform a XOR operation based on the position signal and the sync signal; and a sync determining circuit configured to determine a synchronization state of the second input signal, based on a result of the XOR operation.

In an embodiment, the sensor layer may include: a plurality of electrodes including: a first electrode; and a second electrode adjacent to the first electrode; and a plurality of crossing electrodes. The driving circuit may be configured to sense coordinates of the input device based on a signal profile, the signal profile being measured based on a first current having a first current direction formed in the first electrode by the input device, and a second current having a second current direction opposite to the first current direction formed in the second electrode by the input device.

In an embodiment, the first current in the signal profile may have a negative value, the second current in the signal profile may have a positive value, and the driving circuit may be configured to calculate the coordinates of the input device, based on a zero-crossing value of the signal profile.

In an embodiment, the driving circuit may be configured to: calculate a first signal profile by converting a sign of a portion of the signal profile; calculate a second signal profile by rotating the first signal profile, such that the second signal profile is symmetrical to the first signal profile about a first axis; and calculate the coordinates of the input device, based on a peak value of the second signal profile.

In an embodiment, the plurality of electrodes may further include: a third electrode interposed between the first electrode and the second electrode; and a fourth electrode interposed between the first electrode and the third electrode. The driving circuit may be configured to calculate a first differential signal profile measured based on the first electrode and the third electrode, the driving circuit may be configured to calculate a second differential signal profile by changing a sign of a portion of the first differential signal profile, and the driving circuit may be configured to calculate the coordinates of the input device, based on a zero-crossing value of the first differential signal profile, or a peak value of the second differential signal profile.

In an embodiment, the plurality of electrodes may further include: a third electrode interposed between the first electrode and the second electrode; and a fourth electrode interposed between the first electrode and the third electrode. The driving circuit may be configured to calculate a fourth differential signal profile measured based on the third electrode and the fourth electrode, the driving circuit may be configured to calculate a fifth differential signal profile by changing a sign of a portion of the fourth differential signal profile, and the driving circuit may be configured to calculate the coordinates of the input device based on a peak value of the fourth differential signal profile, or a zero-crossing value of the fifth differential signal profile.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
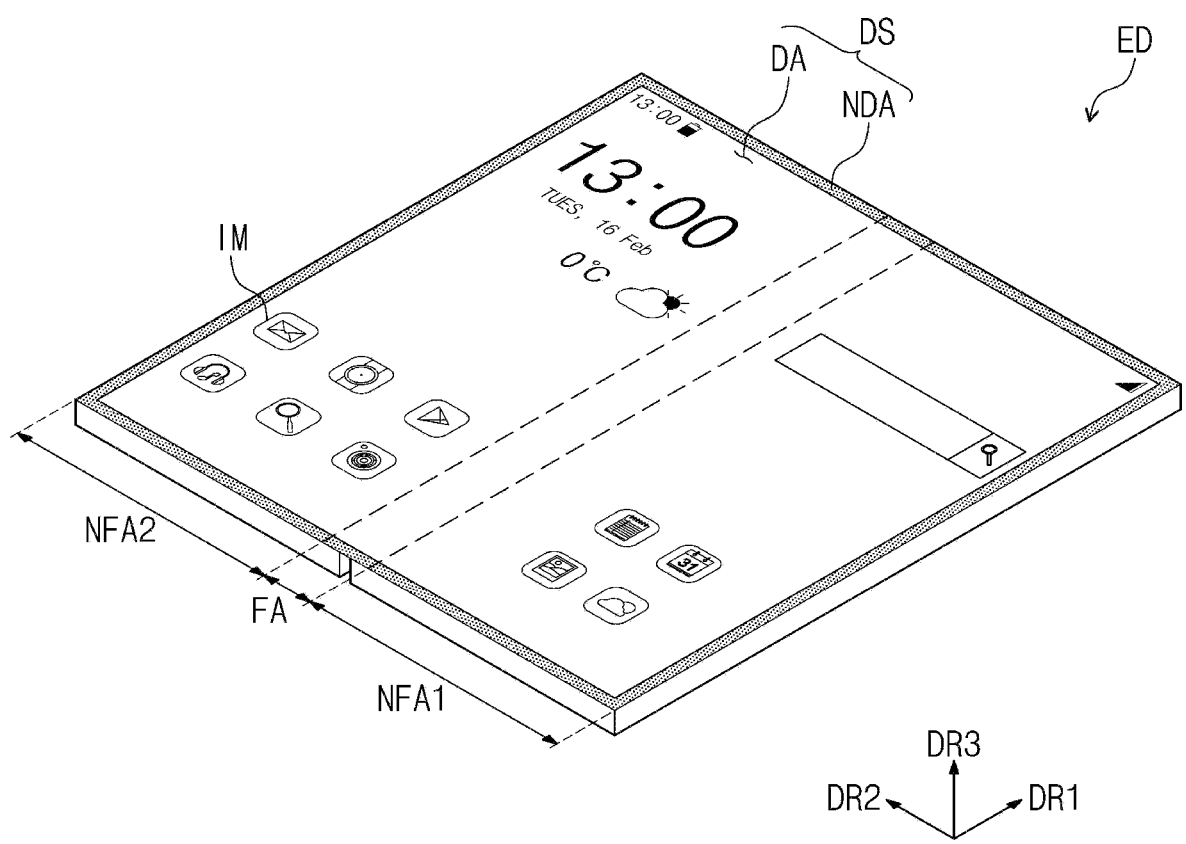
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein (e.g., the signal generator, the control unit, the sync data providing unit, the sync determining unit, the first detecting unit, the second detecting unit, and/or the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
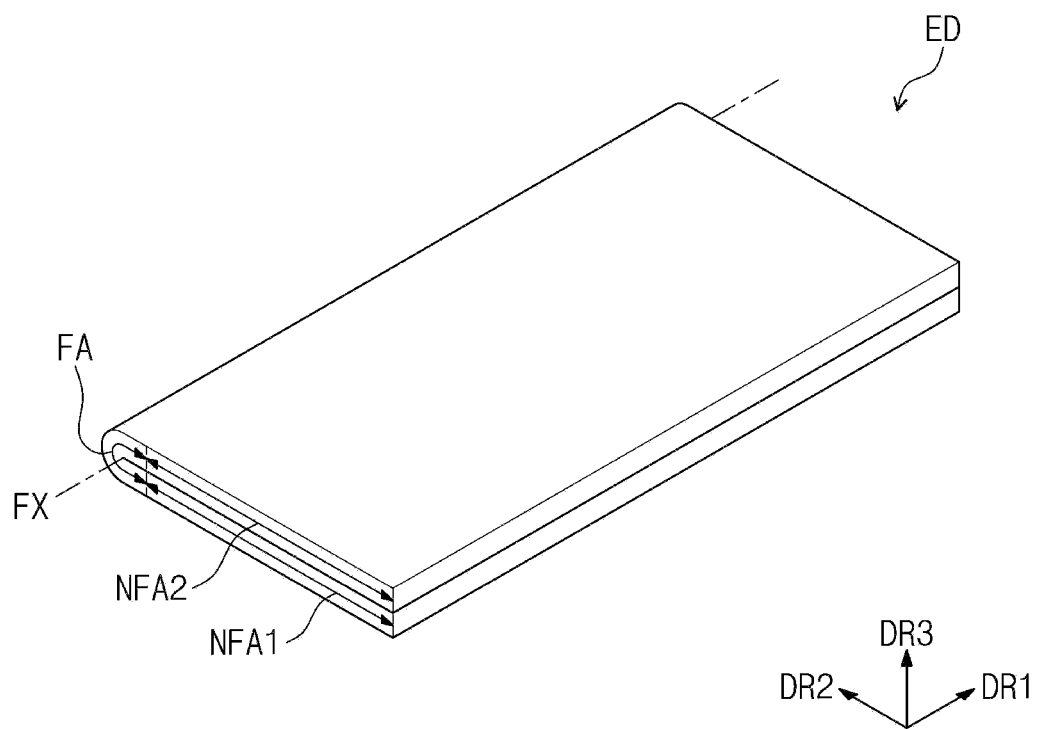
FIG. 1B is a perspective view of an electronic device according to an embodiment of the present disclosure.

FIGS. 1A and 1B are perspective views of an electronic device according to one or more embodiments of the present disclosure. FIG. 1A illustrates an unfolding (or unfolded) state of an electronic device ED, and FIG. 1B illustrates a folding (or folded) state of the electronic device ED.

Referring to FIGS. 1A and 1B, the electronic device ED may be a device that is activated in response to an electrical signal. For example, the electronic device ED may be a cellular phone, a foldable cellular phone, a tablet, a vehicle navigation system, a game console, or a wearable device, but the present disclosure is not limited thereto. Although FIGS. 1A and 1B illustrate that the electronic device ED is a foldable cellular phone by way of example, the present disclosure is not limited thereto.

The electronic device ED according to an embodiment may include a display surface DS defined by a first direction DR1, and a second direction DR2 crossing the first direction DR1. The electronic device ED may provide an image IM to a user through the display surface DS.

The display surface DS may include a display region DA, and a non-display region NDA around (e.g., adjacent to) the display region DA. The display region DA may display the image IM, and the non-display region NDA may not display the image IM. The non-display region NDA may surround (e.g., around a periphery of) the display region DA. However, the present disclosure is not limited thereto, and the form of the display region DA and the form of the non-display region NDA may be deformed.

Hereinafter, a direction perpendicular to or substantially perpendicular to a plane defined by the first direction DR1 and the second direction DR2 is defined as a third direction DR3. Furthermore, as used in the present specification, of the expression "in a plan view" may refer to "when viewed in the third direction DR3".

The electronic device ED may include a folding region FA (or a foldable region), and a plurality of non-folding regions NFA1 and NFA2. The plurality of non-folding regions NFA1 and NFA2 may include a first non-folding region NFA1 and a second non-folding region NFA2. The folding region FA may be interposed between the first non-folding region NFA1 and the second non-folding region NFA2. The first non-folding region NFA1, the folding region FA, and the second non-folding region NFA2 may be sequentially defined in (e.g., arranged along) the second direction DR2.

As illustrated in FIG. 1B, the folding region FA may be folded about (e.g., relative to) a folding axis FX parallel to or substantially parallel to the first direction DR1. The folding region FA may extend in the first direction DR1. The folding region FA may be folded to have a suitable curvature (e.g., a predetermined or specific curvature) and a suitable radius of curvature (e.g., a predetermined or specific radius of curvature). The first non-folding region NFA1 and the second non-folding region NFA2 may face each other, and the electronic device ED may be in an inner-folding (or inner-folded) state to prevent or substantially prevent the display surface DS from being exposed to the outside.

According to an embodiment of the present disclosure, the electronic device ED may be outer-folded in an outer-folding (or outer-folded) state to expose the display surface DS to the outside. According to an embodiment of the present disclosure, the electronic device ED may be configured to repeat and switch from/to an unfolding operation to/from an inner-folding and/or outer-folding operation, but the present disclosure is not limited thereto. According to an embodiment of the present disclosure, the electronic device ED may be configured to select any one of the folding operation, the inner-folding operation, and the outer-folding operation.

Figure 2:
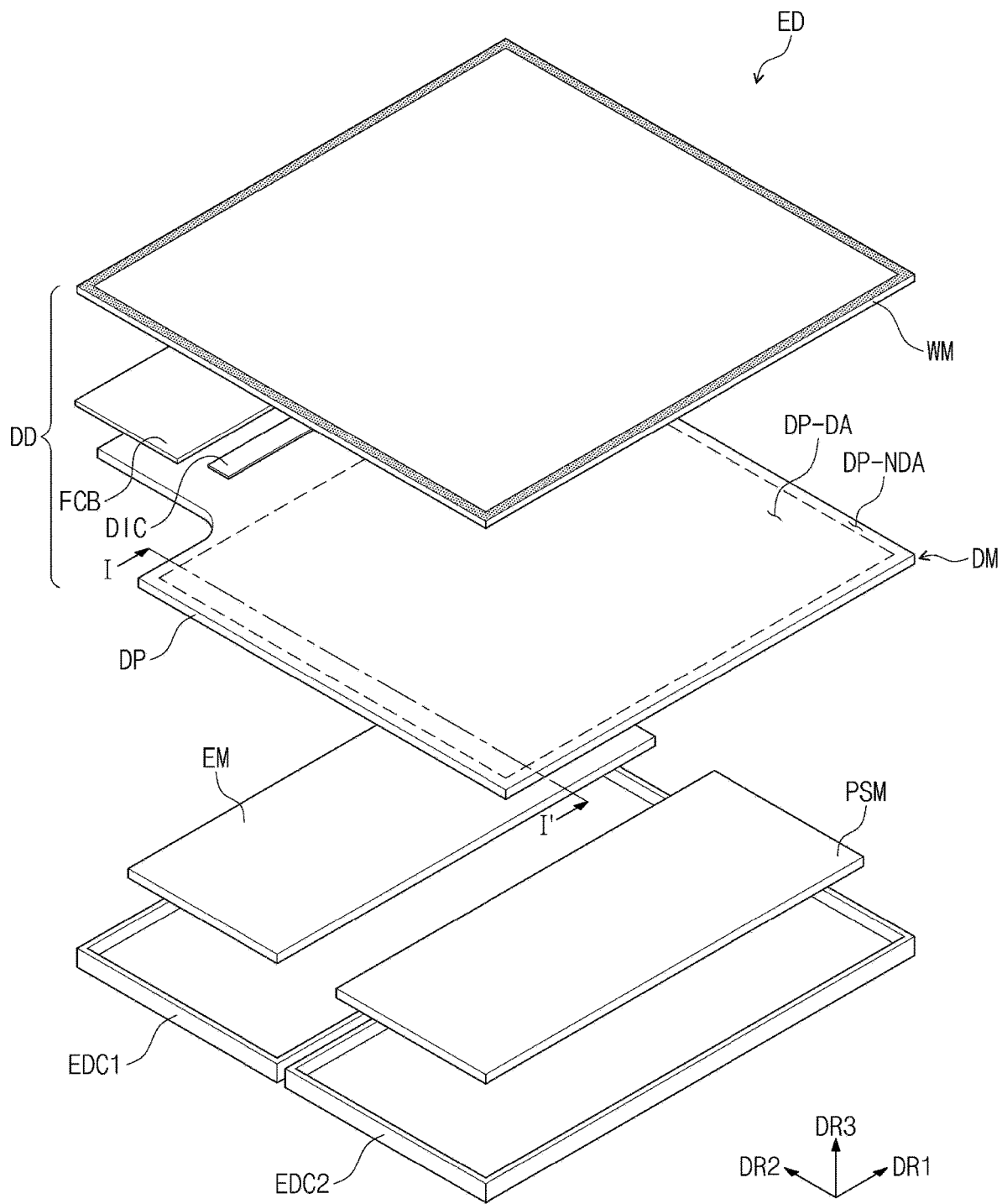
FIG. 2 is an exploded perspective view of an electronic device according to an embodiment of the present disclosure.

FIG. 2 is an exploded perspective view of an electronic device according to an embodiment of the present disclosure.

Referring to FIG. 2, the electronic device ED may include a display device DD, an electronic module (e.g., an electronic circuit, board, or chip) EM, a power supply module (e.g., a power supply) PSM, and cases EDC1 and EDC2. Although not illustrated separately, the electronic device ED may further a mechanism to control the folding operation of the display device DD.

The display device DD generates an image, and senses an external input. The display device DD includes a window module (e.g., a window member or layer) WM and a display module (e.g., a display or a touch-display) DM. The window module WM provides a front surface of the electronic device ED.

The display module DM may include at least a display panel DP. Although FIG. 2 illustrates, for convenience, that the display module DM is the same or substantially the same as the display panel DP, the display module DM may include (e.g., may be) a stacked structure in which a plurality of components, layers, and the like are stacked. The stacked structure of the display module DM will be described in more detail below.

The display panel DP includes a display region DP-DA and a non-display region DP-NDA corresponding to the display region DA (e.g., see FIG. 1A) and the non-display region NDA of the electronic device ED. As used in the present specification, the expression "a region/portion corresponds to another region/portion" refers to the region/portion overlaps with the other region/portion, but is not limited to the region/portion having the same region, area, or size as that of the other region/portion. The display module DM may include a driving chip DIC disposed at (e.g., in or on) the non-display region DP-NDA. The display module DM may further include a flexible circuit film FCB coupled to (e.g., connected to or attached to) the non-display region DP-NDA.

The driving chip DIC may include a driving device, such as a data driving circuit, to drive a pixel of the display panel DP. Although FIG. 2 illustrates that the driving chip DIC is mounted on the display panel DP, the present disclosure is not limited thereto. For example, the driving chip DIC may be mounted on the flexible circuit film FCB.

The electronic module EM includes at least one main driving unit (e.g., a main driver, a main controller, or a main driving circuit). The electronic module EM may include a wireless communication module (e.g., a wireless communication device), a camera module (e.g., a camera), a proximity sensor module (e.g., a proximity sensor), an image input module (e.g., an image input device), a sound input module (e.g., a sound input device or microphone), a sound output module (e.g., a sound output device or speaker), a memory, and/or an external interface module (e.g., an external interface device). The electronic module EM is electrically connected with the power supply module PSM.

The main driving unit (e.g., the main controller) controls the overall operation of the electronic device ED. For example, the main driving unit may activate or deactivate the display device DD in response to a user input. The main driving unit may control the display device DD and the other modules. The main driving unit may include at least one micro-processor.

The cases EDC1 and EDC2 receive the display module DM, the electronic module EM, and the power supply module PSM. Although two cases EDC1 and EDC2 that are spaced apart (e.g., that are separated) from each other are illustrated in FIG. 2 by way of example, the present disclosure is not limited thereto. The electronic device ED may further include a hinge structure to connect the two cases EDC1 and EDC2 to each other. The cases EDC1 and EDC2 may be coupled to (e.g., connected to or attached to) the window module WM. The cases EDC1 and EDC2 may protect the components, such as the display module DM, the electronic module EM, and the power supply module PSM, received (e.g., accommodated) in the cases EDC1 and EDC2.

Figure 3A:
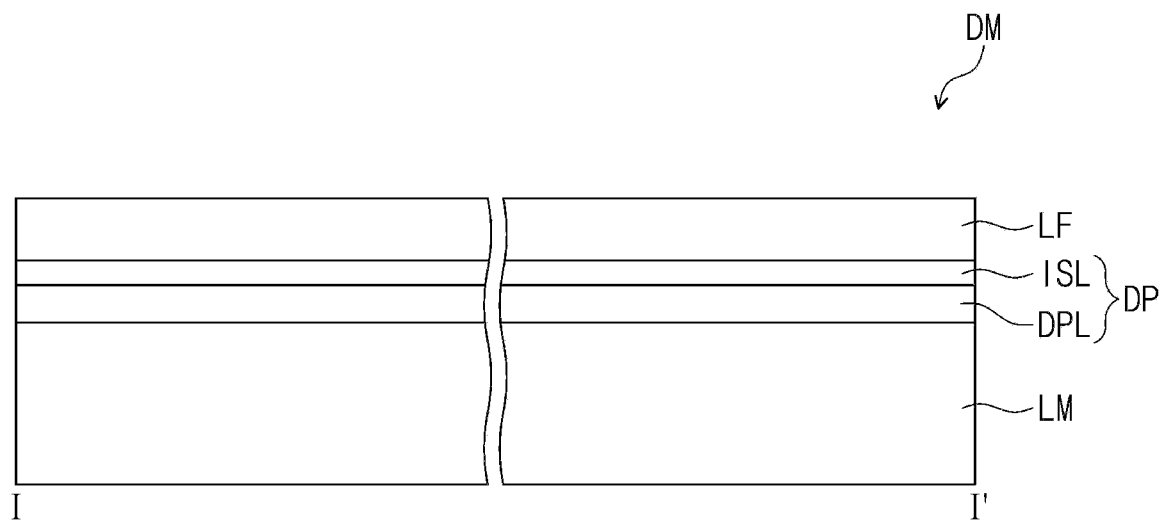
FIG. 3A is a cross-sectional view of a display module according to an embodiment of the present disclosure.

FIG. 3A is a cross-sectional view of a display module according to an embodiment of the present disclosure.

Referring to FIG. 3A, the display module DM may include the display panel DP, an optical film LF disposed on the display panel DP, and a lower member LM disposed under (e.g., underneath) the display panel DP. The display panel DP may include a display layer DPL, and a sensor layer ISL disposed on the display layer DPL. An adhesive layer may be interposed between the members and/or layers, if necessary or desired.

The display layer DPL may be a component that generates an image. The display layer DPL may be a light emitting display layer. For example, the display layer DPL may be an organic light emitting display layer, a quantum dot display layer, a micro-LED display layer, or a nano-LED display layer.

The sensor layer ISL may be disposed on the display layer DPL. The sensor layer ISL may sense an external input applied from the outside. The sensor layer ISL may be an external sensor attached to the display layer DPL, or may be an integral-type sensor formed subsequently thereon during the manufacturing process of the display layer DPL.

The optical film LF may reduce reflectance of light (e.g., external light) incident from the outside. The optical film LF may include a phase retarder and/or a polarizer. The optical film LF may include at least a polarizing film.

As another example, the optical film LF may include color filters. The color filters may have a suitable arrangement (e.g., a predetermined or specific arrangement). The arrangement of the color filters may be determined based on the colors of light emitted from the pixels PX included in the display layer DPL. In addition, the optical film LF may further include a black matrix adjacent to the color filters.

As another example, the optical film LF may include a destructive interference structure. For example, the destructive interference structure may include a first reflective layer and a second reflective layer, which are disposed at (e.g., in or on) mutually different layers from each other. First reflective light and second reflective light emitted from the first reflective layer and the second reflective layer, respectively, may destructively interfere with each other. Accordingly, the reflectance of the external light may be reduced.

The lower member LM may include various suitable functional members. The lower member LM may include a light blocking layer to block light incident onto the display layer DPL, an impact absorption layer to absorb an external impact, a support layer to support the display panel DPL, and/or a heat dissipation layer to dissipate heat emitted from the display layer DPL FIG. 3B is a cross-sectional view of a display panel according to an embodiment of the present disclosure.

Figure 3B:
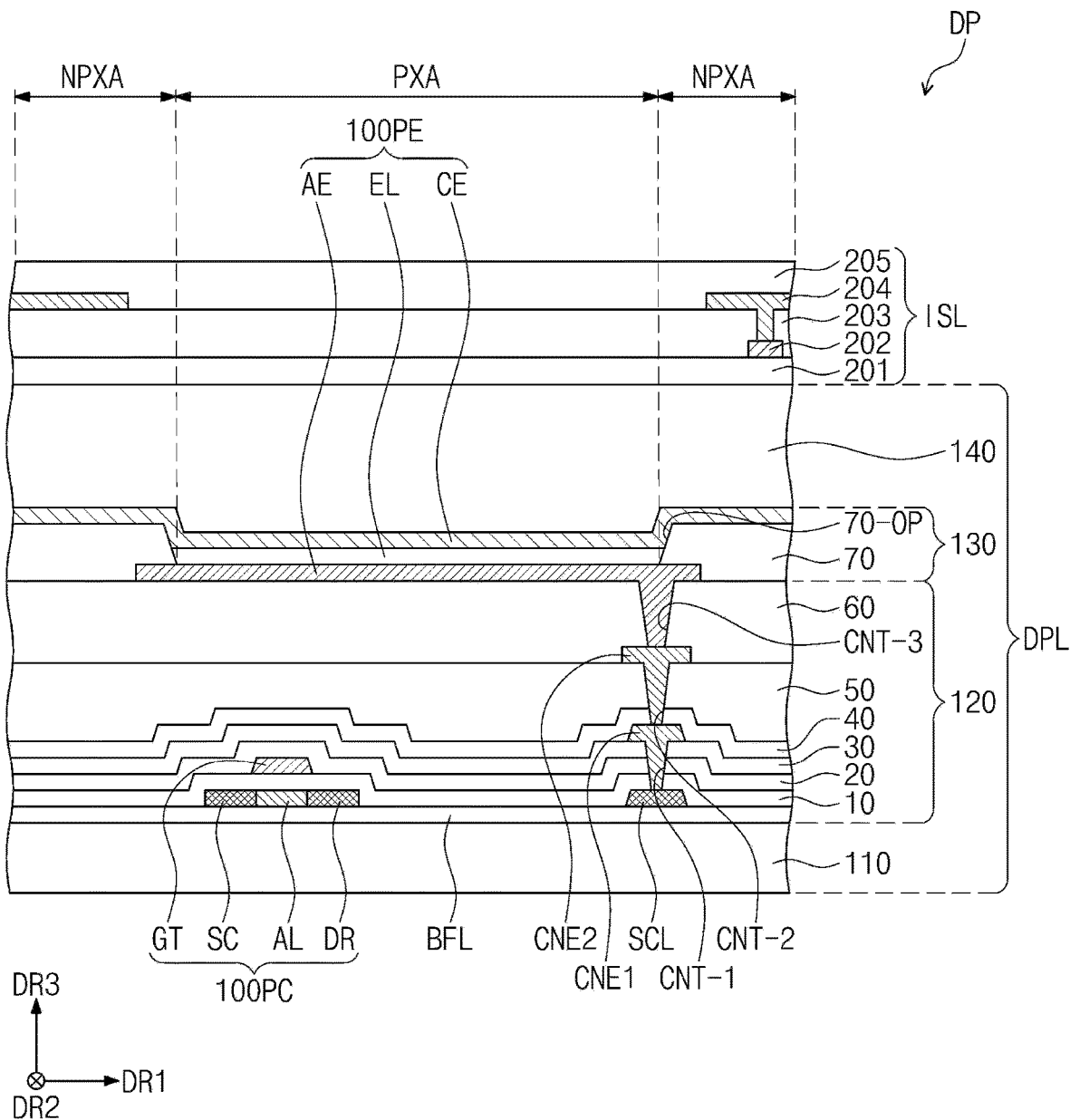
FIG. 3B is a cross-sectional view of a display panel according to an embodiment of the present disclosure.

Referring to FIG. 3B, the display layer DPL may include a base layer 110, a circuit layer 120, a light emitting device layer 130, and an encapsulating layer 140.

The base layer 110 may be a member that provides a base surface for disposing the circuit layer 120 thereon. The base layer 110 may be a glass substrate, a metal substrate, a polymer substrate, or the like. However, the present disclosure is not limited thereto, and the base layer 110 may be an inorganic layer, an organic layer, or a composite material layer.

The base layer 110 may have a multiple layered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include a polyimide-based resin. In addition, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. As used herein, the phrase "~~-based resin" indicates including the functional group of "~~".

At least one inorganic layer may be disposed on a top surface of the base layer 110. The inorganic layer may include at least one of an aluminum oxide, a titanium oxide, a silicon oxide, a silicon nitride, a silicon oxynitride, a zirconium oxide, or a hafnium oxide. The inorganic layer may have a multiple layered structure. Multiple inorganic layers may constitute a barrier layer and/or a buffer layer. According to the present embodiment, the display layer DPL is illustrated as including a buffer layer BFL.

The buffer layer BFL may improve a bonding force between the base layer 110 and a semiconductor pattern. The buffer layer BFL may include at least one of silicon oxide, silicon nitride, or silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, the present disclosure is not limited thereto, and the semiconductor pattern may include amorphous silicon, low-temperature polycrystalline silicon, or an oxide semiconductor.

FIG. 3B illustrates some semiconductor patterns, and other semiconductor patterns may be further disposed at (e.g., in or on) another region. The semiconductor patterns may be arranged in a suitable rule (e.g., a predetermined or specific rule), while crossing the pixels. The semiconductor pattern may have different electrical properties depending on whether or not it is doped. The semiconductor pattern may include a first region having a higher conductivity, and a second region having a lower conductivity. The first region may be doped with N-type dopants or P-type dopants. A P-type transistor may include a doping region doped with the P-type dopant, and an N-type transistor may include a doping region doped with the N-type dopant. The second region may be a non-doping region, or may be a region doped at a concentration lower than the concentration of the first region.

A conductivity of the first region is greater than a conductivity of the second region. The first region may serve as an electrode or a signal line. The second region may correspond to or substantially correspond to an active (e.g., a channel) of a transistor. In other words, a portion of the semiconductor pattern may be the active of a transistor, another portion thereof may be a source or a drain of the transistor, and still another portion thereof may be a connection electrode or a connection signal line.

Each of the pixels may have an equivalent circuit including seven transistors, one capacitor, and a light emitting device, but the present disclosure is not limited thereto, and the equivalent circuit of the pixel may be variously modified as would be understood by those having ordinary skill in the art as needed or desired. FIG. 3B illustrates one transistor 100PC and one light emitting device 100PE of a pixel, by way of example.

A source SC, an active AL (e.g., an active region), and a drain DR of the transistor 100PC may be formed from the semiconductor pattern. The source SC and the drain DR may extend from the active AL in opposite directions to each other, when viewed from a cross-sectional view (e.g., in a cross-sectional view). A portion of a connection signal line SCL formed from the semiconductor pattern is illustrated in FIG. 3B. The connection signal line SCL may be connected to the drain region DR of the transistor 100PC, when viewed in a plan view (e.g., in a plan view).

A first insulating layer 10 may be disposed on the buffer layer BFL. The first insulating layer 10 may be commonly overlapped with a plurality of pixels to cover the semiconductor pattern. The first insulating layer 10 may be an inorganic layer and/or an organic layer, and may have a single-layer structure or a multiple layered structure. The first insulating layer 10 may include at least one of aluminum oxide, titanium oxide, silicon oxide, silicon nitride, silicon oxynitride, zirconium oxide, or hafnium oxide. According to an embodiment, the first insulating layer 10 may be a single silicon oxide layer. The first insulating layer 10, as well as an insulating layer of the circuit layer 120 described in more detail below, may be an inorganic layer and/or an organic layer, and may have a single-layer structure or a multiple layered structure. The inorganic layer may include at least one of the inorganic materials described above, but the present disclosure is not limited thereto.

A gate GT of the transistor 100PC is disposed on the first insulating layer 10. The gate GT may be a portion of a metal pattern. The gate GT overlaps with the active AL. The gate GT may function as a mask in a process of doping the semiconductor pattern.

A second insulating layer 20 may be disposed on the first insulating layer 10 to cover the gate GT. The second insulating layer 20 may be commonly overlapped with the pixels. The second insulating layer 20 may be an inorganic layer and/or an organic layer, and may have a single-layer structure or a multiple layered structure.

The second insulating layer 20 may include at least one of silicon oxide, silicon nitride, or silicon oxynitride. According to the present embodiment, the second insulating layer 20 may have a multiple layered structure including a silicon oxide layer and a silicon nitride layer.

A third insulating layer 30 may be disposed on the second insulating layer 20. The third insulating layer 30 may have a single-layer structure or a multiple layered structure. According to the present embodiment, the third insulating layer 30 may have a multiple layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through (e.g., penetrating) the first insulating layer 10, the second insulating layer 20, and the third insulating layer 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected with the first connection electrode CNE1 through a contact hole CNT-2 formed through (e.g., penetrating) the fourth insulating layer 40 and the fifth insulating layer 50.

A sixth insulating layer 60 may be disposed on the fifth insulating layer 50, and may cover the second connection electrode CNE2. The sixth insulating layer 60 may be an organic layer.

The light emitting device layer 130 may be disposed on the circuit layer 120. The light emitting device layer 130 may include the light emitting device 100PE. For example, the light-emitting device layer 130 may include an organic light-emitting material, a quantum dot, a quantum rod, a micro-LED, or a nano-LED. Hereinafter, for convenience, the light emitting device 100PE may be described in more detail in the context of an organic light emitting device by way of example, but the present disclosure is not limited thereto.

The light emitting device 100PE may include a first electrode AE, a light emitting layer EL, and a second electrode CE.

The first electrode AE may be disposed on the sixth insulating layer 60. The first electrode AE may be connected with the second connection electrode CNE2 through a contact hole CNT-3 formed through (e.g., penetrating) the sixth insulating layer 60.

A pixel defining layer 70 may be disposed on the sixth insulating layer 60, and may cover a portion of the first electrode AE. An opening 70-OP is defined in (e.g., penetrates) the pixel defining layer 70. The opening 70-OP of the pixel defining layer 70 exposes at least a portion of the first electrode AE.

The display region DA (e.g., see FIG. 1A) may include a light emitting region PXA, and a non-light emitting region NPXA adjacent to the light emitting region PXA. The non-light emitting region NPXA may surround (e.g., around a periphery of) the light emitting region PXA. According to an embodiment, the light emitting region PXA is defined to correspond to the portion of the first electrode AE, which is exposed by the opening 70-OP.

The light emitting layer EL may be disposed on the first electrode AE. The light emitting layer EL may be disposed in a region defined by the opening 70-OP. In other words, the light emitting layer EL may be separately formed for each of the pixels. When the light emitting layer EL is separately formed for each of the pixels, each of the light emitting layers EL may emit light of at least one of a blue color, a red color, or a green color. However, the present disclosure is not limited thereto, and the light emitting layer EL may be connected to a plurality of pixels, and may be commonly provided for the plurality of pixels. In this case, the light emitting layer EL may provide blue light or white light.

The second electrode CE may be disposed on the light emitting layer EL. The second electrode CE may have an integral-type form, and may be commonly disposed in the plurality of pixels.

In some embodiments, a hole control layer may be interposed between the first electrode AE and the light emitting layer EL. The hole control layer may be commonly disposed at (e.g., in or on) the light emitting region PXA and the non-light emitting region NPXA. The hole control layer may include a hole transport layer, and in some embodiments, may further include a hole injection layer. An electron control layer may be interposed between the light emitting layer EL and the second electrode CE. The electron control layer may include an electron transport layer, and in some embodiments, may further include an electron injection layer. The hole control layer and the electron control layer may be commonly formed in the pixels by using an open mask.

The encapsulating layer 140 may be disposed on the light emitting device layer 130. The encapsulating layer 140 may include an inorganic layer, an organic layer, and an inorganic layer that are sequentially stacked, but the present disclosure is not limited thereto, and the layers constituting the encapsulating layer 140 are not limited thereto.

The inorganic layers may protect the light emitting device layer 130 from moisture and/or oxygen, and the organic layer may protect the light emitting device layer 130 from foreign materials, such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the present disclosure is not limited thereto.

The sensor layer ISL may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, or silicon oxide. As another example, the base layer 201 may be an organic layer including epoxy resin, acrylate resin, or an imide-based resin. The base layer 201 may have a single-layer structure or a multiple layered structure formed in the third direction DR3.

Each of the first conductive layer 202 and the second conductive layer 204 may have a single-layer structure or a multiple layered structure formed in the third direction DR3.

A conductive layer having the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), or indium zinc tin oxide (IZTO). In addition, the transparent conductive layer may include a conductive polymer, such as PEDOT, a metal nano-wire, or graphene.

A conductive layer having the multiple layered structure may include a plurality of metal layers. The metal layers may, for example, have a three-layered structure of titanium/aluminum/titanium. The conductive layer having the multiple layered structure may include at least one metal layer, and at least one transparent conductive layer.

At least one of the sensing insulating layer 203 or the cover insulating layer 205 may include an inorganic layer. The inorganic layer may include at least one of an aluminum oxide, a titanium oxide, a silicon oxide, a silicon nitride, a silicon oxynitride, a zirconium oxide, or a hafnium oxide.

At least one of the sensing insulating layer 203 or the cover insulating layer 205 may include an organic layer or film. The organic layer or film may include at least one of an acrylate-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

Figure 4:
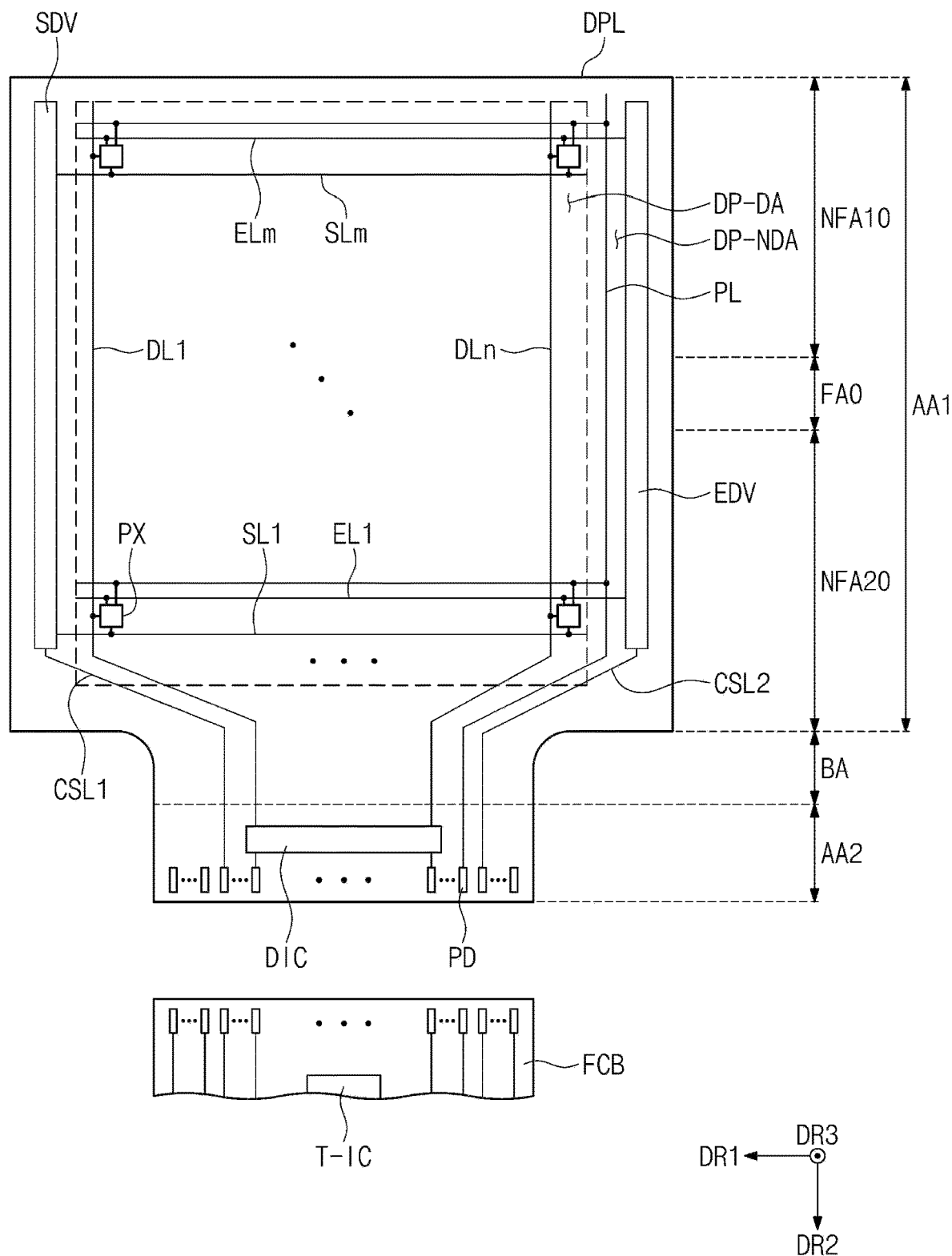
FIG. 4 is a plan view of a display layer according to an embodiment of the present disclosure.

FIG. 4 is a plan view of a display layer according to an embodiment of the present disclosure.

Referring to FIG. 4, the display region DP-DA, and the non-display region DP-NDA around (e.g., adjacent to) the display region DA may be defined in the display layer DPL. The display region DP-DA and the non-display region DP-NDA may be distinguished therebetween depending on whether or not the pixel PX is present. The pixel PX may be disposed at (e.g., in or on) the display region DP-DA. A scan driver SDV, a data driver, and a light emitting driver EDV may be disposed at (e.g., in or on) the non-display region DP-NDA. The data driver may be a portion of a circuit included in the driving chip DIC.

The display layer DPL may include a first panel region AA1, a bending region BA, and a second panel region AA2 defined along the second direction DR2. The second panel region AA2 and the bending region BA may be partial regions of the non-display region DP-NDA. The bending region BA is interposed between the first panel region AA1 and the second panel region AA2.

The first panel region AA1 is a region corresponding to the display surface DS (e.g., see FIG. 1A). The first panel region AA1 may include a first non-folding region NFA10, a second non-folding region NFA20, and a folding region FAO. The first non-folding region NFA10, the second non-folding region NFA20, and the folding region FAO may correspond to the first non-folding region NFA1, the second non-folding region NFA2, and the folding region FA, respectively, shown in FIGS. 1A and 1B.

A width (or a length) of the bending region BA and a width (or a length) of the second panel region AA2, which are parallel to or substantially parallel to the first direction DR1, may be less than a width (or a length) of the first panel region AA1, which is parallel to or substantially parallel to the first direction DR1. An area having a shorter length in a bending axis direction may be more easily bent.

The display layer DPL may include the plurality of pixels PX, a plurality of scan lines SL1 to SLm, a plurality of data lines DL1 to DLn, a plurality of light emitting lines EL1 to ELm, first and second control lines CSL1 and CSL2, a power line PL, and a plurality of pads PD. Here, "m" and "n" are natural numbers. The pixels PX may be connected to the scan lines SL1 to SLm, the data lines DL1 to DLn, and the light emitting lines EL1 to Elm.

The scan lines SL1 to SLm may extend in the first direction DR1, and may be electrically connected with the scan driver SDV. The data lines DL1 to DLn may extend in the second direction DR2, and may be electrically connected with the driving chip DIC via the bending region BA. The light emitting lines EL1 to ELm may extend in the first direction DR1, and may be electrically connected with the light emitting driver EDV.

The power line PL may include a portion extending in the second direction DR2, and a portion extending in the first direction DR1. The portion extending in the first direction DR1 and the portion extending in the second direction DR2 may be disposed at (e.g., in or on) mutually different layers from each other. The portion of the power line PL that extends in the second direction DR2 may extend to the second panel region AA2 via the bending region BA. The power line PL may provide a first voltage to the pixels PX.

The first control line CSL1 may be connected to the scan driver SDV, and may extend toward a lower end of the second panel region AA2 via the bending region BA. The second control line CSL2 may be connected to the light emitting driver EDV, and may extend toward the lower end of the second panel region AA2 via the bending region BA.

When viewed in a plane (e.g., in a plan view), the pads PD may be disposed to be adjacent to the lower end of the second panel region AA2. The driving chip DIC, the power line PL, the first control line CSL1, and the second control line CSL2 may be electrically connected to the pads PD. The flexible circuit film FCB may be electrically connected with the pads PD through an anisotropic conductive film.

Figure 5A:
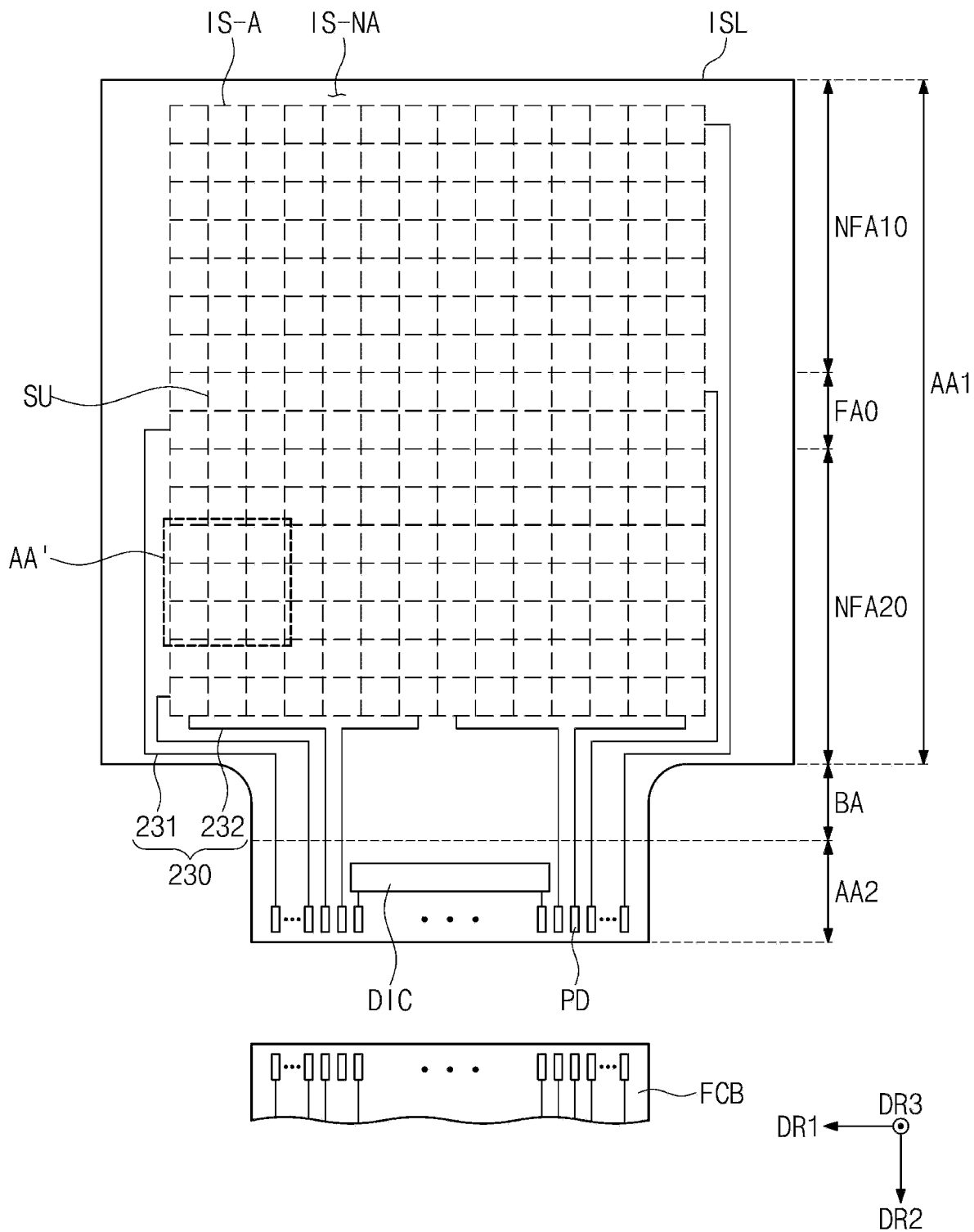
FIG. 5A is a plan view of a sensor layer according to an embodiment of the present disclosure.
Figure 5B:
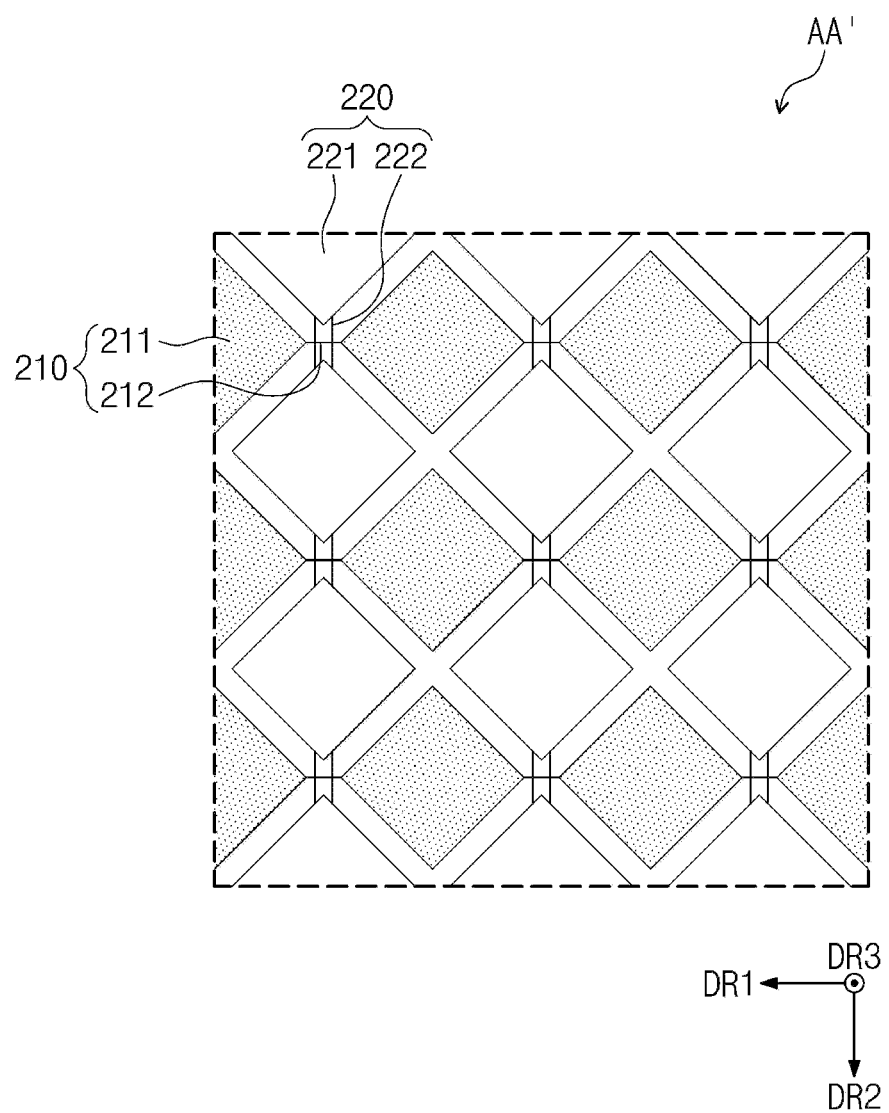
FIG. 5B is an enlarged plan view of the region AA' illustrated in FIG. 5A.

FIG. 5A is a plan view of a sensor layer according to an embodiment of the present disclosure. FIG. 5B is an enlarged plan view of the region AA' illustrated in FIG. 5A.

Referring to FIGS. 5A and 5B, the sensor layer ISL may include a sensing region IS-A and a peripheral region IS-NA, which are defined in the sensor layer ISL. The sensing region IS-A may be a region activated in response to an electrical signal. For example, the sensing region IS-A may be a region to sense an external input. The peripheral region IS-NA may be adjacent to the sensing region IS-A, and for example, may surround (e.g., around a periphery of) the sensing region IS-A.

The sensor layer ISL may include electrodes 210, crossing electrodes 220, and sensing lines 230. The electrodes 210 and the crossing electrodes 220 may be disposed at (e.g., in or on) the sensing region IS-A, and the sensing lines 230 may be disposed at (e.g., in or on) the peripheral region IS-NA. The sensor layer ISL may acquire information on the external input, for example, based on a change in a mutual capacitance between the electrodes 210 and the crossing electrodes 220.

The sensor layer ISL may include a plurality of sense units (e.g., a plurality of sensing areas) SU. Each of the plurality of sense units SU may be defined as an area or region in which any one electrode of the electrodes 210 and any one crossing electrode of the crossing electrodes 220 cross each other.

The electrodes 210 may extend in the first direction DR1, and may be arranged along the second direction DR2. Each of the electrodes 210 may include first parts 211 and a second part 212. The second part 212 may be adjacent to two first parts 211 that are adjacent to each other.

The crossing electrodes 220 may be arranged along the first direction DR1, and may extend in the second direction DR2. The crossing electrodes 220 may include patterns 221 and connection patterns 222 (e.g., bridge patterns 222). Each of the connection patterns 222 may electrically connect two adjacent patterns 221 to each other. Although the two adjacent patterns 221 are shown in FIG. 5B as being connected to each other by two connection patterns 222, the present disclosure is not limited thereto. The second part 212 may be insulated from the two connection patterns 222, while crossing the two connection patterns 222.

The patterns 221, the first parts 211, and the second parts 212 may be disposed at (e.g., in or on) the same layer as each other, and the connection patterns 222 may be disposed at (e.g., in or on) a layer different from the layer of the patterns 221, the first parts 211, and the second parts 212. For example, the patterns 221, the first parts 211, and the second parts 212 may be included in the second conductive layer 204 (e.g., see FIG. 3B), and the connection patterns 222 may be included in the first conductive layer 202. The above described structure may be referred to as a bottom bridge structure. However, the present disclosure is not limited thereto. For example, the patterns 221, the first parts 211, and the second parts 212 may be included in the first conductive layer 202 (e.g., see FIG. 3B), and the connection patterns 222 may be included in the second conductive layer 204. This structure may be referred to as a top bridge structure.

FIG. 5B illustrates some examples of the shapes of the electrodes 210 and the crossing electrodes 220, and the arrangement relationship between the electrodes 210 and the crossing electrodes 220. However, the shapes of the electrodes 210 and the crossing electrodes 220 constituting the sensor layer ISL, and the arrangement relationship between the electrodes 210 and the crossing electrodes 220 are not limited to those illustrated in FIG. 5B.

The sensing lines 230 may be electrically connected to corresponding pads, respectively, of the pads PD. The sensing lines 230 may include lines 231 and crossing lines 232.

The lines 231 may be electrically connected to the electrodes 210. Some of the lines 231 may be connected to left electrodes of the electrodes 210, respectively. Others of the lines 231 may be connected to right electrodes of the electrodes 210, respectively. The crossing lines 232 may be electrically connected to the crossing electrodes 220. However, the connection relationship between the lines 231 and the electrodes 210 and the connection relationship between the crossing lines 232 and the crossing electrodes 220 are not limited to the example illustrated in FIG. 5A.

A driving circuit T-IC may be electrically connected to the sensor layer ISL to provide a driving signal to the sensor layer ISL, and may calculate coordinates based on the external input. The driving circuit T-IC may be mounted on the flexible circuit film FCB (e.g., see FIG. 2). The driving circuit T-IC may be electrically connected to the lines 231 and the crossing lines 232.

Figure 5C:
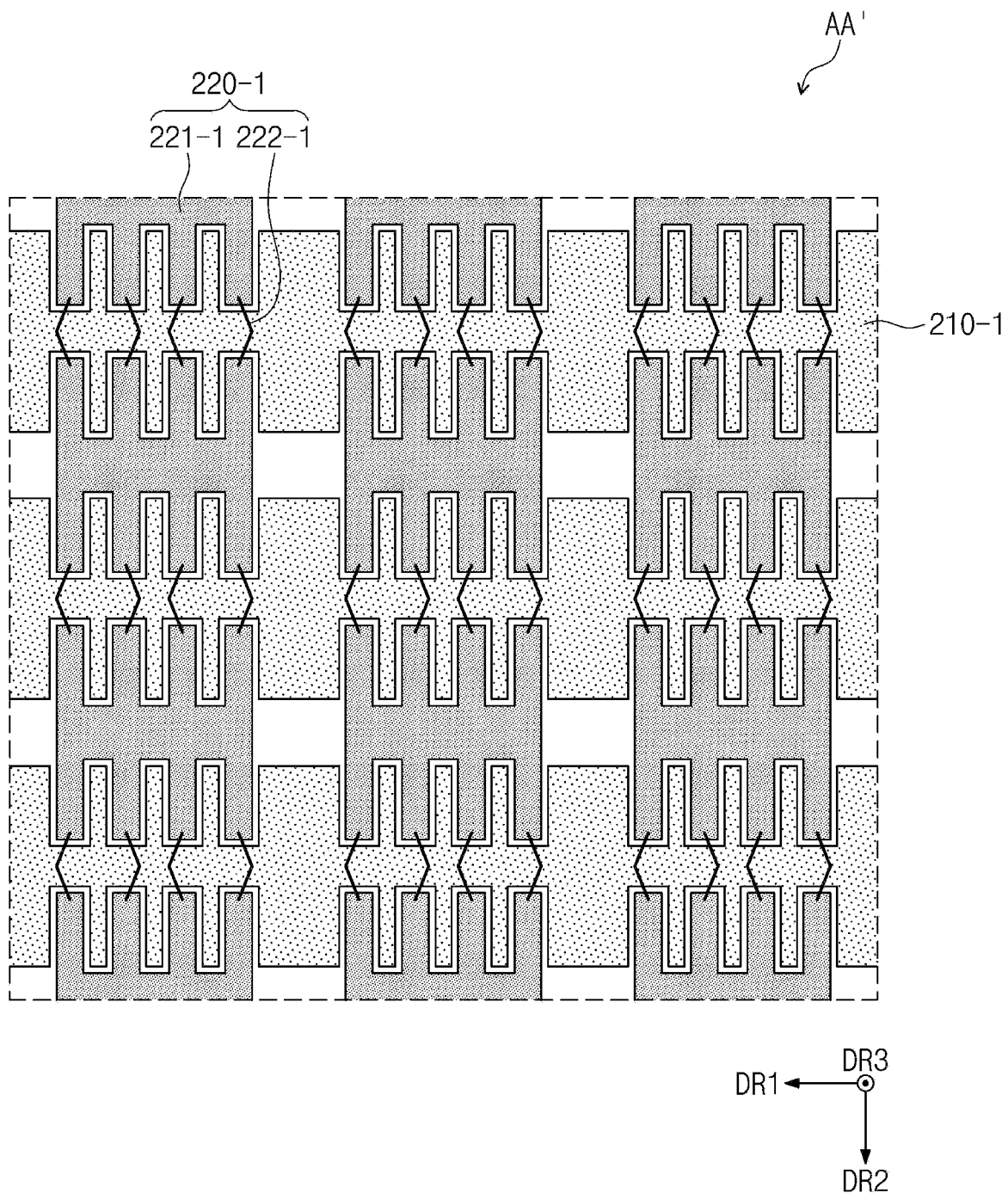
FIG. 5C is an enlarged plan view of the region AA' illustrated in FIG. 5A.

FIG. 5C is an enlarged plan view of the region AA' illustrated in FIG. 5A.

FIG. 5C illustrates electrodes 210-1 and crossing electrodes 220-1 having shapes different from the shapes of the electrodes 210 and the crossing electrodes 220 shown in FIG. 5B. For example, the electrodes 210-1 and the crossing electrodes 220-1 may have bar shapes.

The electrodes 210-1 may extend in the first direction DR1, and may be arranged along the second direction DR2. The crossing electrodes 220-1 may be arranged along the first direction DR1, and may extend in the second direction DR2. The crossing electrodes 220-1 may include patterns 221-1 and connection patterns 222-1 (e.g., bridge patterns 222-1). The connection patterns 222-1 may electrically connect two adjacent patterns 221-1 to each other. Although the two adjacent patterns 221-1 are shown as being connected to each other by four connection patterns 222-1, the present disclosure is not limited thereto. One electrode 210-1 may be insulated from the connection patterns 222-1 connecting the two adjacent patterns 221-1 to each other, while crossing the connection patterns 222-1. Although FIG. 5C illustrates a form in which the electrodes 210-1 and the patterns 221-1 are engaged with each other, the present disclosure is not limited thereto.

The electrodes 210 and 210-1 and the crossing electrodes 220 and 220-1 described above with reference to FIGS. 5B and 5C may have a mesh structure. In this case, an opening may be defined in the electrodes 210 and 210-1 and the crossing electrodes 220 and 220-1. However, the present disclosure is not limited thereto. In some embodiments, the electrodes 210 and 210-1 and the crossing electrodes 220 and 220-1 may be transparent electrodes having no opening.

Figure 6:
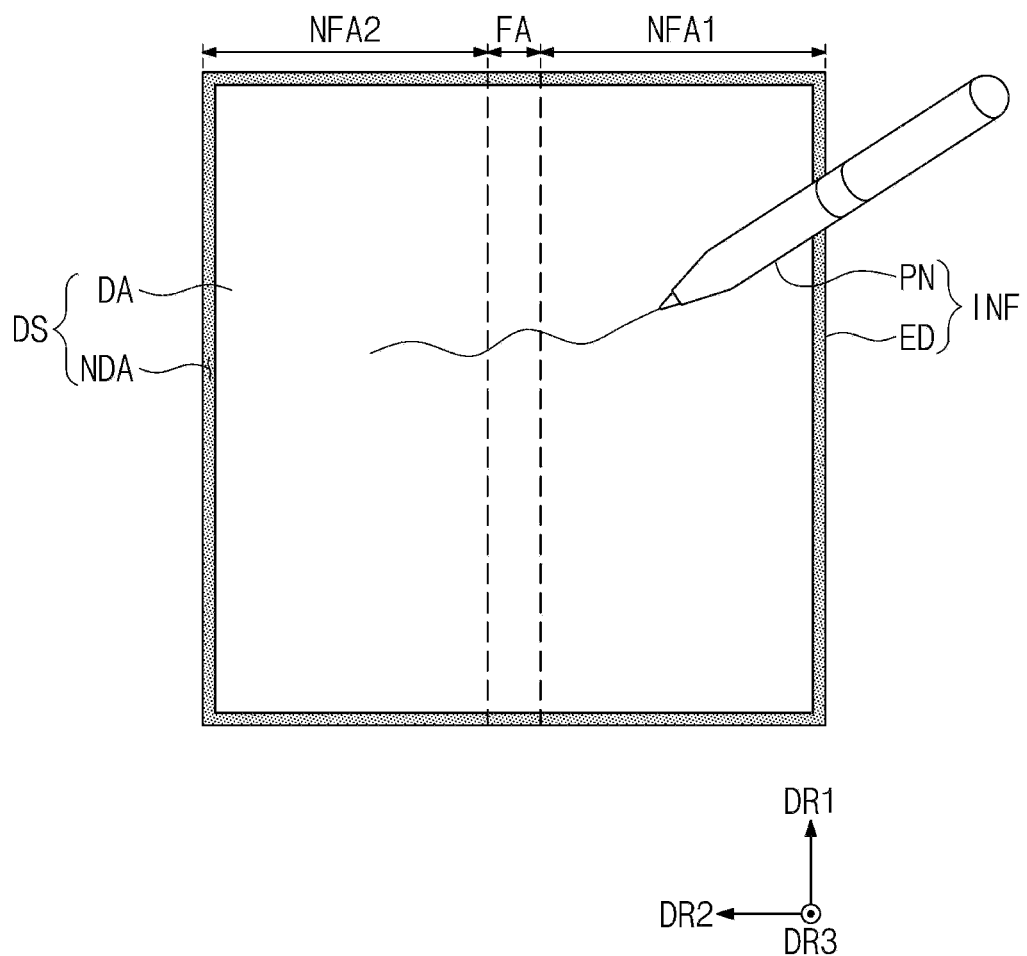
FIG. 6 is a view illustrating an interface device according to an embodiment of the present disclosure.

FIG. 6 is a view illustrating an interface device according to an embodiment of the present disclosure.

Referring to FIG. 6, an interface device INF may include the electronic device ED and an input device PN. The interface device INF may refer to an electronic system, a touch system, an input/output system, a digitizer system, a pen tablet, or a pen terminal.

The input device PN may be an electronic pen to generate a magnetic field having a suitable resonance frequency (e.g., a predetermined or specific resonance frequency). The input device PN may be configured to transmit an output signal through an electro-magnetic resonance (EMR) method. The input device PN may be referred to as an electronic pen, a stylus pen, or an electro-magnetic pen.

According to an embodiment of the present disclosure, the input device PN may include a signal generator to generate an AC power source provided in the input device PN. In this case, the input device PN may have an inductive current generated from the signal generator provided therein, even if an external magnetic field is absent. Accordingly, even if the electronic device ED does not include a digitizer to form a magnetic field, the electronic device ED may sense an input by the input device PN to output the magnetic field.

The input device PN based on the EMR method may exhibit superior output efficiency than the output efficiency of an active electrostatic (AES) pen. For example, when a transmission (TX) signal of the input device PN and a transmission (TX) signal of the AES pen have the same or substantially the same frequency (e.g., 1.8 MHZ) and the same or substantially the same input voltage (e.g., 17 V) as each other, the intensity of a signal output from the input device PN may be 40 times stronger than the intensity of a signal output from the AES pen. In addition, the output signal from the input device PN, which may generate the TX signal having the frequency of 1.8 MHZ and the voltage of 1V, may have an intensity similar to the intensity of the output signal from the AES pen, which generates the TX signal having the frequency of 1.8 MHz and the voltage of 17 V. Accordingly, the input device PN may consume less battery power than the battery power consumed by the AES pen.

In addition, according to an embodiment of the present disclosure, when the input device PN is used, the electronic device ED may not include the digitizer. Because the digitizer may increase the thickness and the weight of the electronic device ED, flexibility may be degraded. However, according to an embodiment, the electronic device ED may not include the digitizer, and may sense the input of the input device PN by using the sensor layer ISL (e.g., see FIG. 3A), and thus, the thickness and weight of the electronic device ED may be reduced, and flexibility may be improved.

Figure 7:
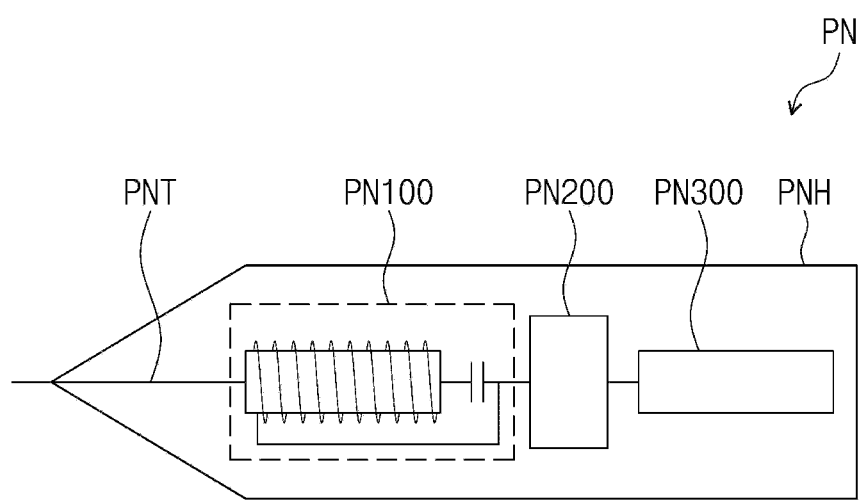
FIG. 7 is a block diagram of an electronic pen according to an embodiment of the present disclosure.

FIG. 7 is a block diagram of an electronic pen according to an embodiment of the present disclosure.

Referring to FIG. 7, the input device PN may include a housing PNH, a pen tip PNT, a resonance circuit unit (e.g., a resonator or a resonance circuit) PN100, a signal generator PN200, and a power supply unit (e.g., a power supply) PN300.

The housing PNH may have a pen shape, and may have a receiving space formed therein. The resonance circuit unit PN100, the signal generator PN200, and the power supply unit PN300 may be received in the receiving space defined inside the housing PNH. The pen tip PNT may be disposed at an end portion of the housing PNH. For example, a portion of the pen tip PNT may be exposed to the outside of the housing PNH. Remaining portions of the pen tip PNT may be inserted into the housing PNH.

The resonance circuit unit PN100 may be a resonance circuit including an inductor and a capacitor. The capacitor may store, in the form of an electric field, the flow of a current, which is generated according to (e.g., made by) a signal (e.g., the TX signal). The inductor may store, in the form of a magnetic field, the flow of the current, which is generated according to (e.g., made by) the signal. The inductor may include a magnetic substance, and a coil wound around the magnetic substance.

The signal generator PN200 may generate a signal (e.g., the TX signal). The signal generator PN200 may include an integrated circuit (IC) or an oscillator for a desired purpose (e.g., a predetermined or specific purpose). The signal generator PN200 may output an AC signal having a suitable frequency (e.g., a predetermined or specific frequency). For example, the signal generated from the signal generator PN200 may be a fixed frequency signal, such as a sinusoidal signal having the frequency of 560 kHz, but the present disclosure is not limited thereto.

The signal generator PN200 may employ a modulation method, such as an on-off keying (OOK) method, a phase shift keying (PSK) method, a differential PSK method, a frequency shift keying (FSK) method, a binary PSK method, or a differential BPSK method, when transmitting the signal (e.g., in a downlink).

The resonance circuit unit PN100 may be charged with power by the signal generator PN200. Accordingly, the signal generator PN200 may stop transmitting a signal, after the charging of the resonance circuit unit PN100 is finished. The inductive current may be generated due to the signal in the resonance circuit unit PN100, and the resonance circuit unit PN100 may make resonance to discharge a magnetic field.

The power supply unit PN300 may supply power to the signal generator PN200. The power supply unit PN300 may include a battery or a capacitor having a suitable capacitance (e.g., a higher capacitance).

According to an embodiment of the present disclosure, because the input device PN includes the signal generator PN200, the input device PN may operate in an active type, as well as a passive type. Accordingly, even if the electronic device ED (e.g., see FIG. 6) does not include a digitizer to form a magnetic field, the electronic device ED may sense an input by the input device PN, which outputs the magnetic field.

Figure 8:
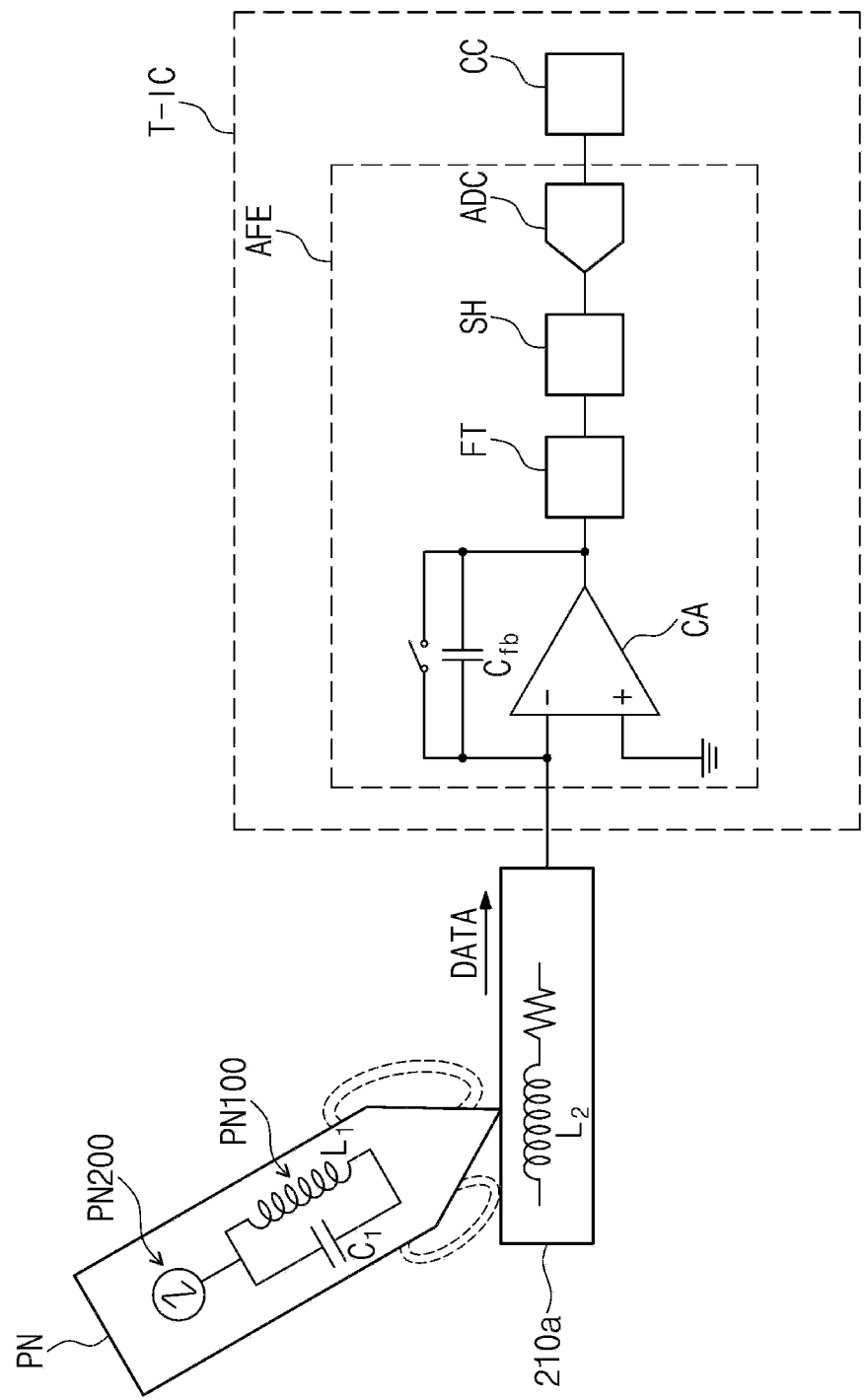
FIG. 8 is a schematic diagram illustrating a method of an electronic device sensing an input by an input device, according to an embodiment of the present disclosure.
Figure 9:
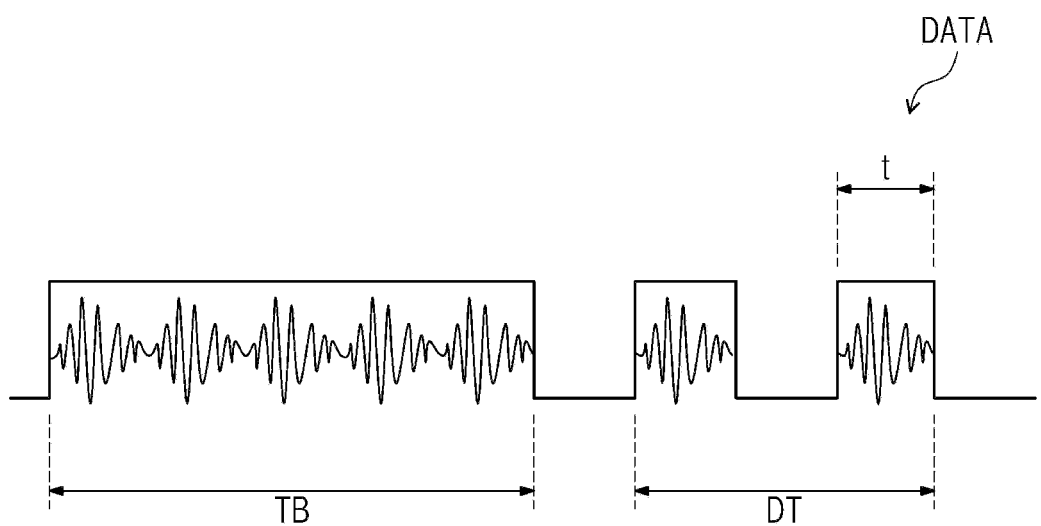
FIG. 9 illustrates input data by an input device, according to an embodiment of the present disclosure.

FIG. 8 is a schematic diagram illustrating a method of an electronic device sensing an input by an input device, according to an embodiment of the present disclosure. FIG. 9 illustrates input data by the input device, according to an embodiment of the present disclosure.

Referring to FIGS. 8 and 9, the driving circuit T-IC may include an analog front end unit AFE (e.g., an analog front end circuit), and a control unit (e.g., a controller) CC.

The analog front end unit AFE may include an amplifier unit (e.g., an amplifier, abbreviated as "amp unit") CA, a filter unit (e.g., a filter) FT, a sample and hold unit (e.g., a sample and hold circuit) SH, and an analog-to-digital converting unit (e.g., an analog-to-digital converter) ADC.

The amp unit CA may receive an electrical signal that is changed based on an input by the input device PN, and may output a touch signal. The amp unit CA may include an inverting input terminal and a non-inverting input terminal.

The inverting input terminal of the amp unit CA may be electrically connected to an electrode 210a. A reference potential may be applied to the non-inverting input terminal of the amp unit CA. A capacitor Cfb may be connected between the inverting input terminal of the amp unit CA and an output terminal of the amp unit CA.

According to an embodiment of the present disclosure, the amp unit CA may include a charge amp and a trans-impedance amp.

When the input device PN approaches, an inductive current may be applied to the electrode 210a, due to the magnetic field (B-field) output from the input device PN, and a second input signal DATA may be received through the inductive current. An inductor L2 may be a parasitic inductor generated in the electrode 210a. The capacitor Cfb may receive the inductive current, and may output a voltage signal based on the inductive current.

The filter unit FT may be connected to the amp unit CA. The filter unit FT may remove noise from the signal output from the amp unit CA. The filter unit FT may include a band pass filter BPF. However, the present disclosure is not limited thereto, and the type of the filter unit FT is provided for illustrative purposes. For example, the filter unit FT according to an embodiment of the present disclosure may include a low pass filter (LPF) and a high pass filter (HPF).

The sample and hold unit SH may be connected to the filter unit FT. The sample and hold unit SH may perform a sample and hold operation with respect to the signal output from the filter unit FT.

The analog-to-digital converting unit ADC may be connected to the sample and hold unit SH. The analog-to-digital converting unit ADC may convert an analog signal, which is output from the sample and hold unit SH, into a digital signal.

The control unit CC may be connected to the analog-to-digital converting unit ADC. The control unit CC may receive the second input signal DATA based on the digital signal.

The second input signal DATA may include a position signal TB and a data signal DT.

The position signal TB may be a burst signal for transmitting position information of the input device PN, and a synchronization signal for synchronization between the electronic device ED and the input device PN.

The data signal DT may include tilt information, pressure information, and button information of the input device PN.

The second input signal DATA may have a waveform having an amplitude that changes over time. The second input signal DATA may include a plurality of resonance signals. When the second input signal DATA is transmitted from the input device PN, the electronic device ED (e.g., see FIG. 2) may sense a magnetic field, and receive a signal provided from the input device PN. A time (e.g., a predetermined or specific time) at which each of a plurality of resonance signals is provided may be tens of micro-seconds (µs).

Figure 10:
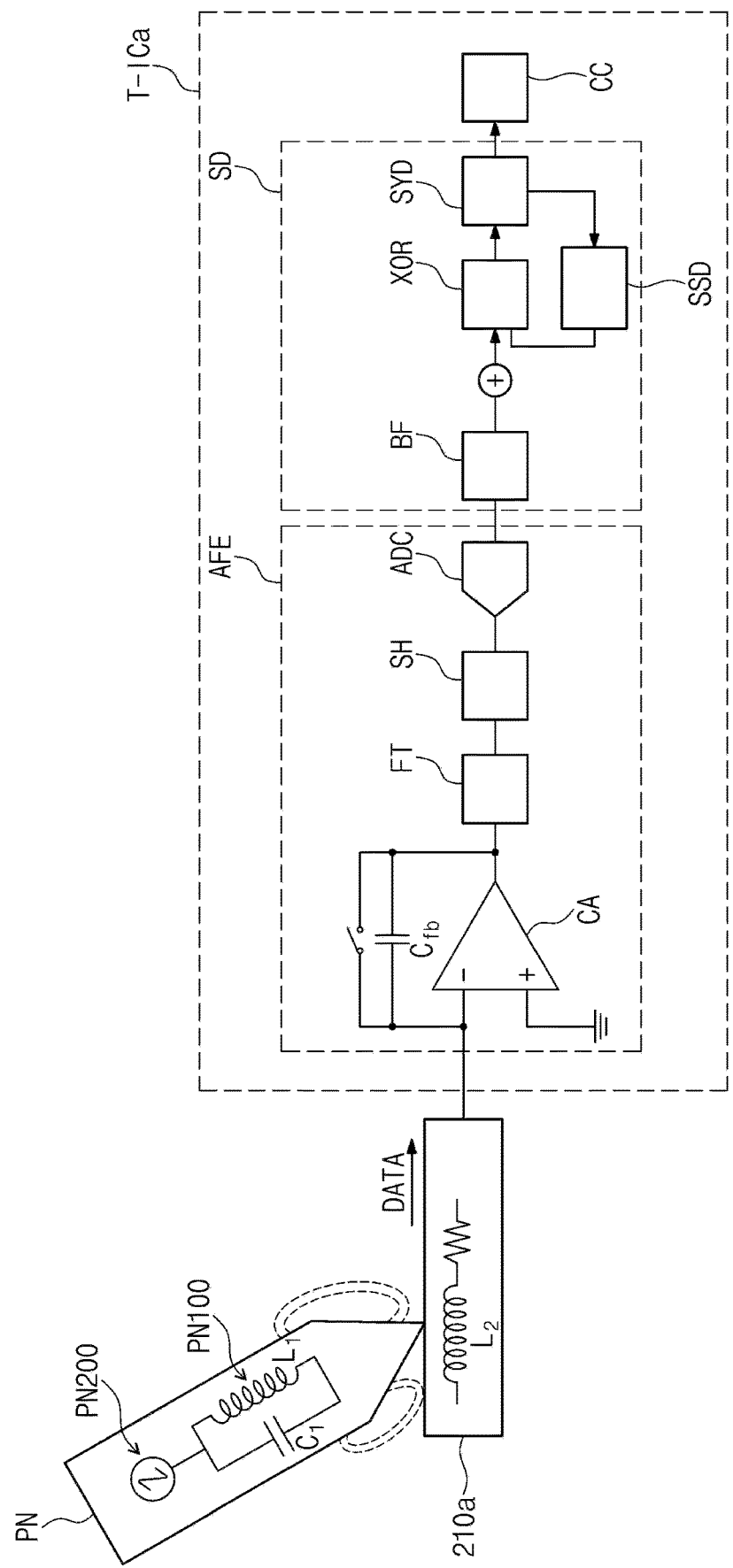
FIG. 10 is a schematic diagram illustrating a method of an electronic device sensing an input by an input device, according to an embodiment of the present disclosure.
Figure 11A:
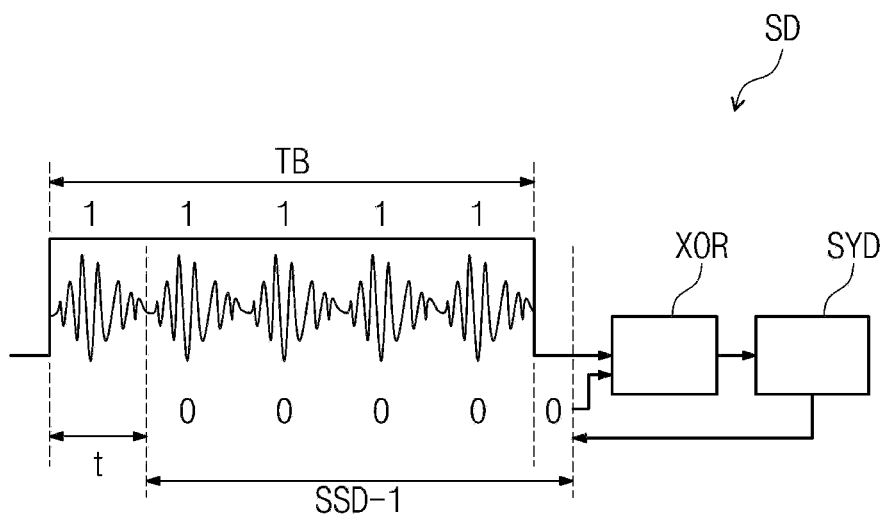
FIGS. 11A-11B are schematic diagrams illustrating the operation of a sync control unit, according to an embodiment of the present disclosure.
Figure 11B:
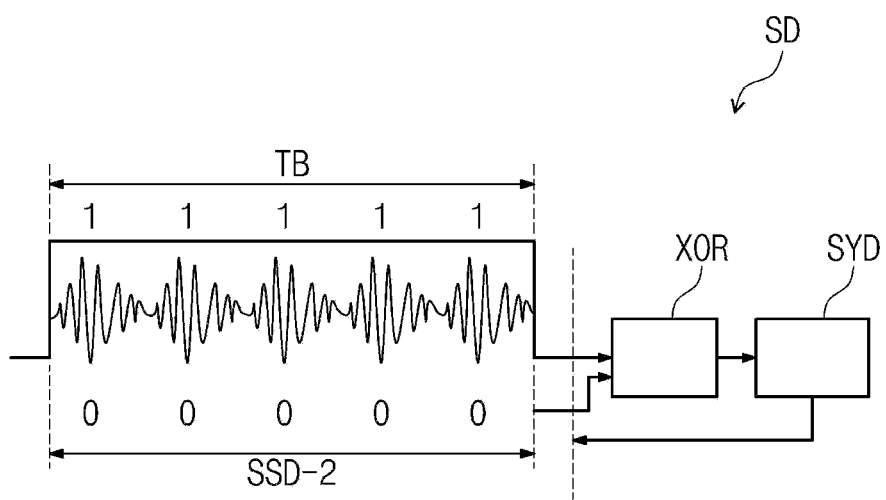

FIG. 10 is a schematic diagram illustrating a method of an electronic device sensing an input by an input device, according to an embodiment of the present disclosure. FIGS. 11A and 11B are schematic diagrams illustrating the operation of a sync control unit, according to an embodiment of the present disclosure. In FIG. 10, the same or substantially the same components as the components described above with reference to FIG. 8 are assigned with the same reference numerals, and thus, redundant description thereof may not be repeated.

Referring to FIGS. 9 to 11B, a driving circuit T-ICa may further include a sync control unit (e.g., a sync controller) SD connected to the analog front end unit AFE.

The sync control unit SD may include a data buffer unit (e.g., a data buffer) BF, a sync data providing unit (e.g., a sync data providing circuit) SSD, an XOR gate XOR, and a sync determining unit (e.g., a sync determining circuit) SYD.

The data buffer unit BF may store (e.g., may temporarily store) the position signal TB of the second input signal DATA, which is converted in the form of a digital signal by the analog-to-digital converting unit ADC. The data buffer unit BF may provide the stored position signal TB to the XOR gate XOR.

The sync data providing unit SSD may provide the position signal TB, and sync signals SSD-1 and SSD-2 inverted to the position signal TB, to the XOR gate XOR.

The XOR gate XOR may be connected to the analog front end unit AFE and the sync data providing unit SSD, and may calculate an XOR operation for the position signal TB and the sync signals SSD-1 and SSD-2.

The sync determining unit SYD may determine a synchronizing state of the second input signal DATA, based on the result of the XOR operation.

The second input signal DATA synchronized by the sync control unit SD may be provided to the control unit CC.

FIG. 11A is a block diagram illustrating a synchronizing state, in which synchronization is not achieved. Referring to FIG. 11A, the position signal TB of the second input signal DATA output from the analog front end unit AFE may be provided to the XOR gate XOR. For example, the position signal TB may be data having five values of '1s'. Although FIG. 11A illustrates the position signal TB having five bits, the number of bits of the position signal TB is not limited thereto.

The sync data providing unit SSD may generate the first sync signal SSD-1. The first sync signal SSD-1 may have a signal that is inverted to the position signal TB. For example, the position signal TB may be data having five values of '0s'. Although FIG. 11A illustrates the first sync signal SSD-1 having five bits, the number of bits of the first sync signal SSD-1 according to an embodiment of the present disclosure may be determined based on the position signal TB, and may be variously provided.

Synchronization is not achieved by a time (e.g., a predetermined or specific time) 't'. In this case, the result value of the XOR operation for the position signal TB and the first sync signal SSD-1, which are provided to the XOR gate XOR, may be four. The sync determining unit SYD may determine the synchronizing state of the second input signal DATA based on the result of the XOR operation. For example, the sync determining unit SYD may determine the second input signal DATA as being synchronized, when the result value of the XOR operation is '5'. Here, because the result value of the XOR operation illustrated in FIG. 11A is '4', the sync determining unit SYD does not determine the second input signal DATA as being synchronized, and may provide a signal for shifting a clock signal by the time 't' to the sync data providing unit SSD.

FIG. 11B is a block diagram illustrating a synchronizing state in which synchronization is achieved. Referring to FIG. 11B, the data buffer unit BF may store the position signal TB of the second input signal DATA. The position signal TB may be provided to the XOR gate XOR.

The sync data providing unit SSD may provide the second sync signal SSD-2 obtained by shifting the first sync signal SSD-1 by the time 't'.

The result value of the XOR operation for the position signal TB and the second sync signal SSD-2, which are provided to the XOR gate XOR, may be '5'. For example, the sync determining unit SYD may determine the second input signal DATA as being synchronized, when the result value of the XOR operation is '5'.

When the sync determining unit SYD does not determine the second input signal DATA as being synchronized, the sync determining unit SYD may repeatedly provide a signal for shifting a clock signal by the time 't' to the sync data providing unit SSD, until synchronization is achieved.

According to one or more embodiments of the present disclosure, the position signal TB may be synchronized by the sync control unit SD. As the position signal TB is synchronized, the second input signal DATA may be synchronized. In other words, the data signal DT may be synchronized. The electronic device ED (e.g., see FIG. 1A) may receive precise tilt information, input information, and button information received from the input device PN. The accuracy of the data signal DT may be improved. Accordingly, the electronic device ED (e.g., see FIG. 1A) having improved reliability may be provided.

Figure 12:
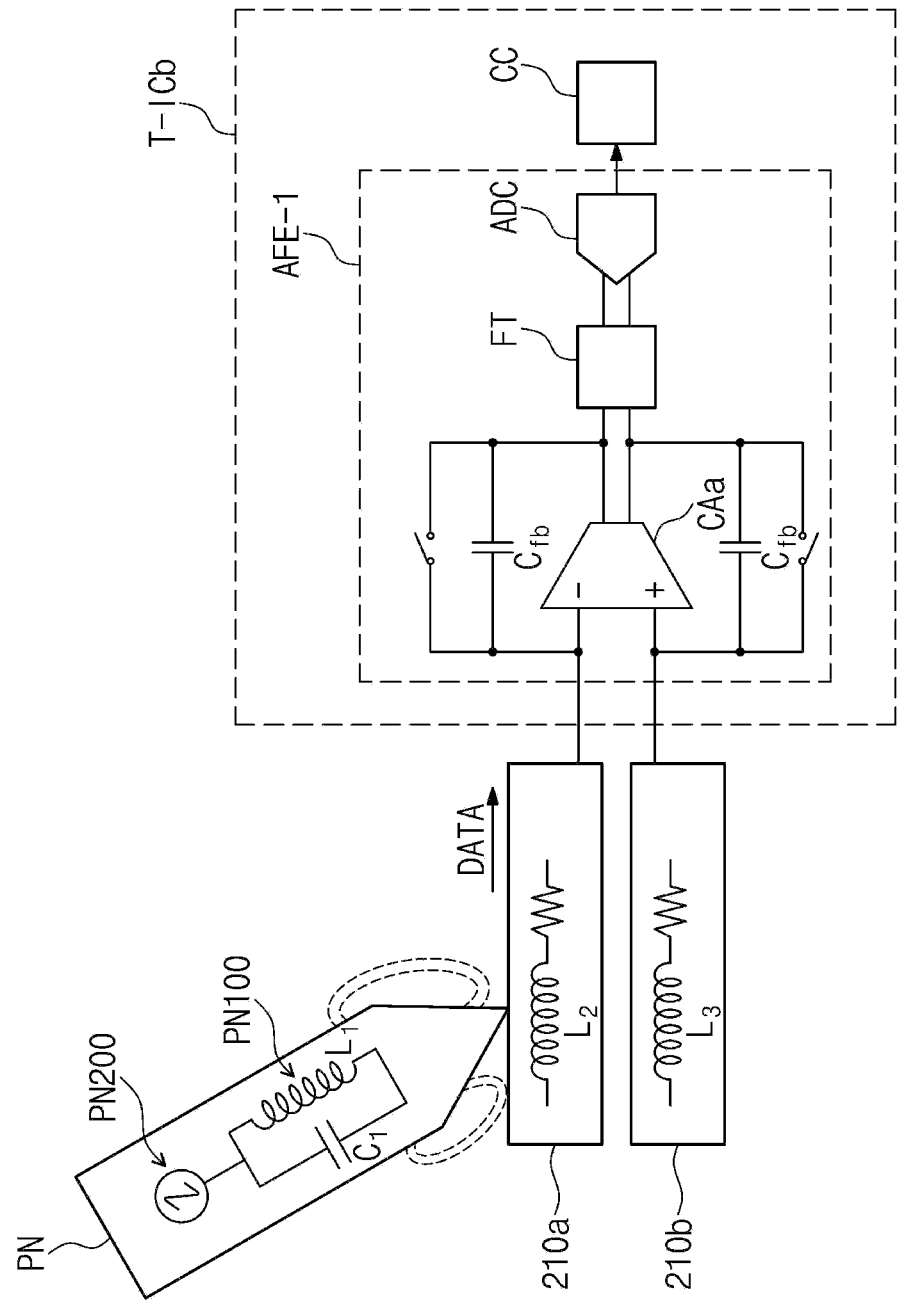
FIG. 12 is a schematic diagram illustrating a method of an electronic device sensing an input by an input device, according to an embodiment of the present disclosure.

FIG. 12 is a schematic diagram illustrating a method of an electronic device sensing an input by an input device, according to an embodiment of the present disclosure. In FIG. 12, the same or substantially the same components as the components described above with reference to FIG. 8 are assigned with the same reference numerals, and thus, redundant description thereof may not be repeated.

Referring to FIG. 12, the plurality of electrodes 210 (e.g., see FIG. 5B) may include a first electrode 210a, and a second electrode 210b adjacent to the first electrode 210a.

A driving circuit T-ICb may include an analog front end unit (e.g., an analog front end circuit) AFE-1 and the control unit CC.

The analog front end unit AFE-1 may include an amp unit (e.g., an amplifier) CAa, the filter unit FT, and the analog-to-digital converting unit ADC.

The first electrode 210a and the second electrode 210b may be connected to the amp unit CAa. The amp unit CAa may include an inverting input terminal and a non-inverting input terminal. The first electrode 210a may be electrically connected to the inverting input terminal. The second electrode 210b may be electrically connected to the non-inverting input terminal.

When the input device PN approaches, an inductive current may be applied to the first electrode 210a and the second electrode 210b by a magnetic field (B-field) output from the input device PN. A second input signal DATA may be received through the inductive current. An inductor L2 may be a parasitic inductor generated in the electrode 210a. An inductor L3 may be a parasitic inductor generated in the electrode 210b. The capacitors Cf may receive the inductive currents, respectively, and may output voltage signals based on the inductive currents.

Figure 13:
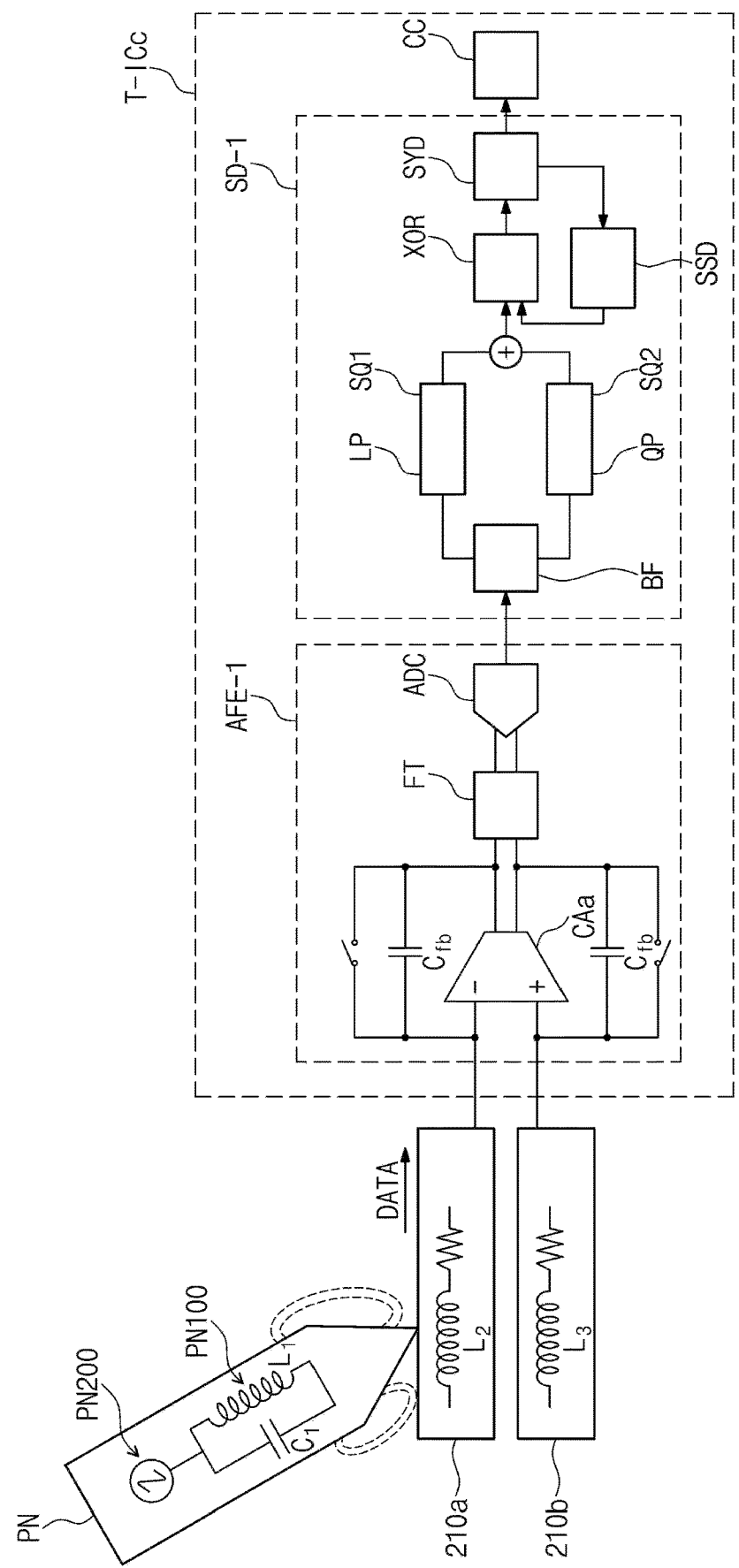
FIG. 13 is a schematic diagram illustrating a method of an electronic device sensing an input by an input device, according to an embodiment of the present disclosure.

FIG. 13 is a schematic diagram illustrating a method of an electronic device sensing an input by an input device, according to an embodiment of the present disclosure. In FIG. 13, the same or substantially the same components as the components described above with reference to FIGS. 10 and 12 are assigned with the same reference numerals, and thus, redundant description thereof may not be repeated.

Referring to FIG. 13, a driving circuit T-ICc may include the analog front end unit AFE-1, a sync control unit (e.g., a sync controller) SD-1, and the control unit CC.

The sync control unit SD-1 may include the data buffer unit BF, a first detecting unit (e.g., a first detecting circuit) SQ1, a second detecting unit (e.g., a second detecting circuit) SQ2, the sync data providing unit SSD, the XOR gate XOR, and the sync determining unit SYD.

The data buffer unit BF may temporarily store the position signal TB of the second input signal DATA, which is converted in the form of a digital signal by the analog-to-digital converting unit ADC. The data buffer unit BF may provide the stored position signal TB to the first detecting unit SQ1 and the second detecting unit SQ2. The first detecting unit SQ1 may detect an in-phase component of the position signal TB based on an I-phase.

The second detecting unit SQ2 may detect a quadrature component of the position signal TB based on a quadrature-phase.

The XOR gate XOR may be connected to the first detecting unit SQ1, the second detecting unit SQ2, and the sync data providing unit SSD. A value obtained by combining the in-phase component and the quadrature component may be provided to the XOR gate XOR. The sync data providing unit SSD may provide the sync signals SSD-1 and SSD-2, which are inverted to the position signal TB, to the XOR gate XOR.

The XOR gate XOR may calculate an XOR operation for the position signal TB and the sync signal.

The sync determining unit SYD may determine a synchronizing state of the input signal DATA, based on the result of the XOR operation.

The second input signal DATA synchronized by the sync control unit SD may be provided to the control unit CC.

Figure 14:
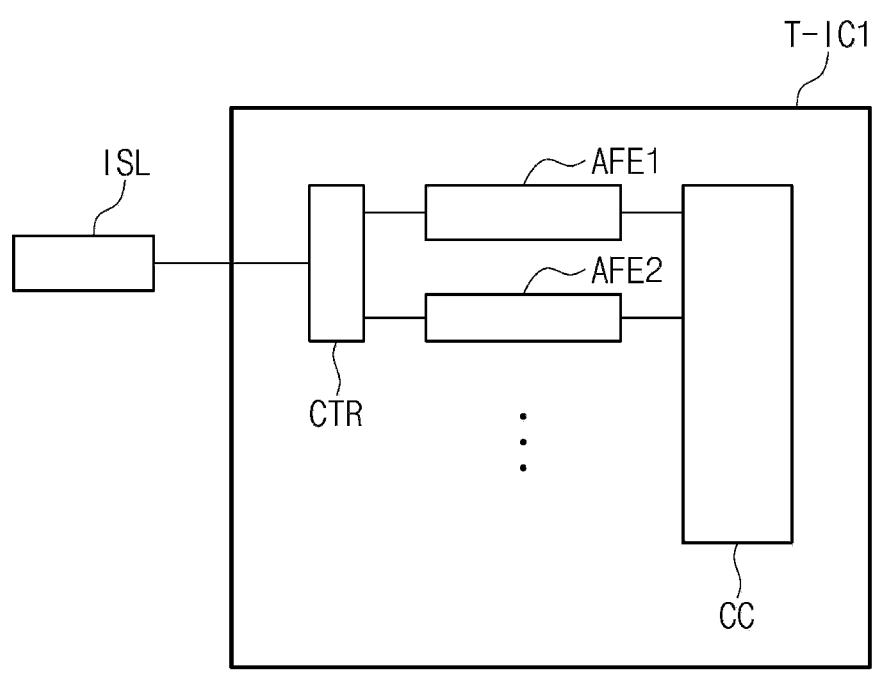
FIG. 14 is a block diagram illustrating a sensor layer and a driving circuit, according to an embodiment of the present disclosure.
Figure 15A:
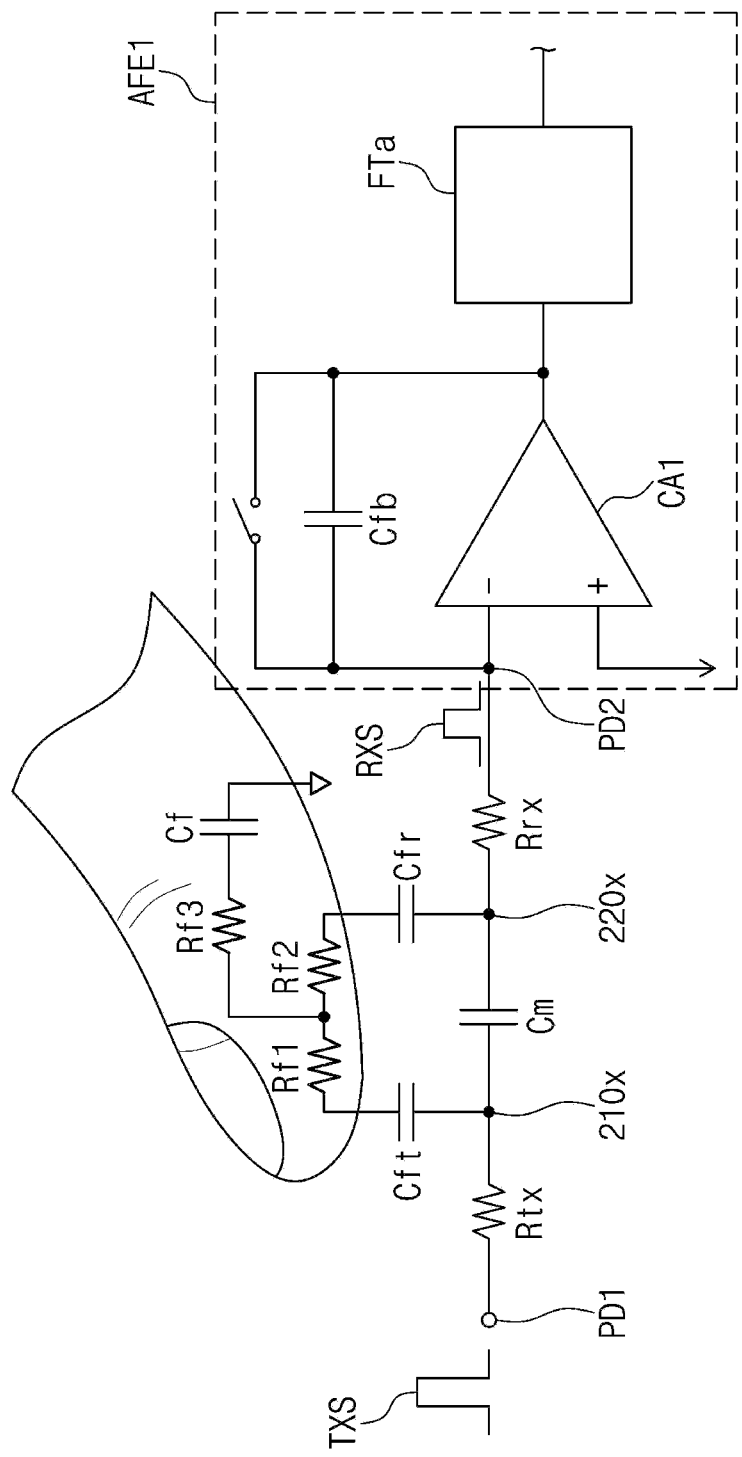
FIG. 15A is an equivalent circuit diagram illustrating an operation in a first touch mode, according to an embodiment of the present disclosure.
Figure 15B:
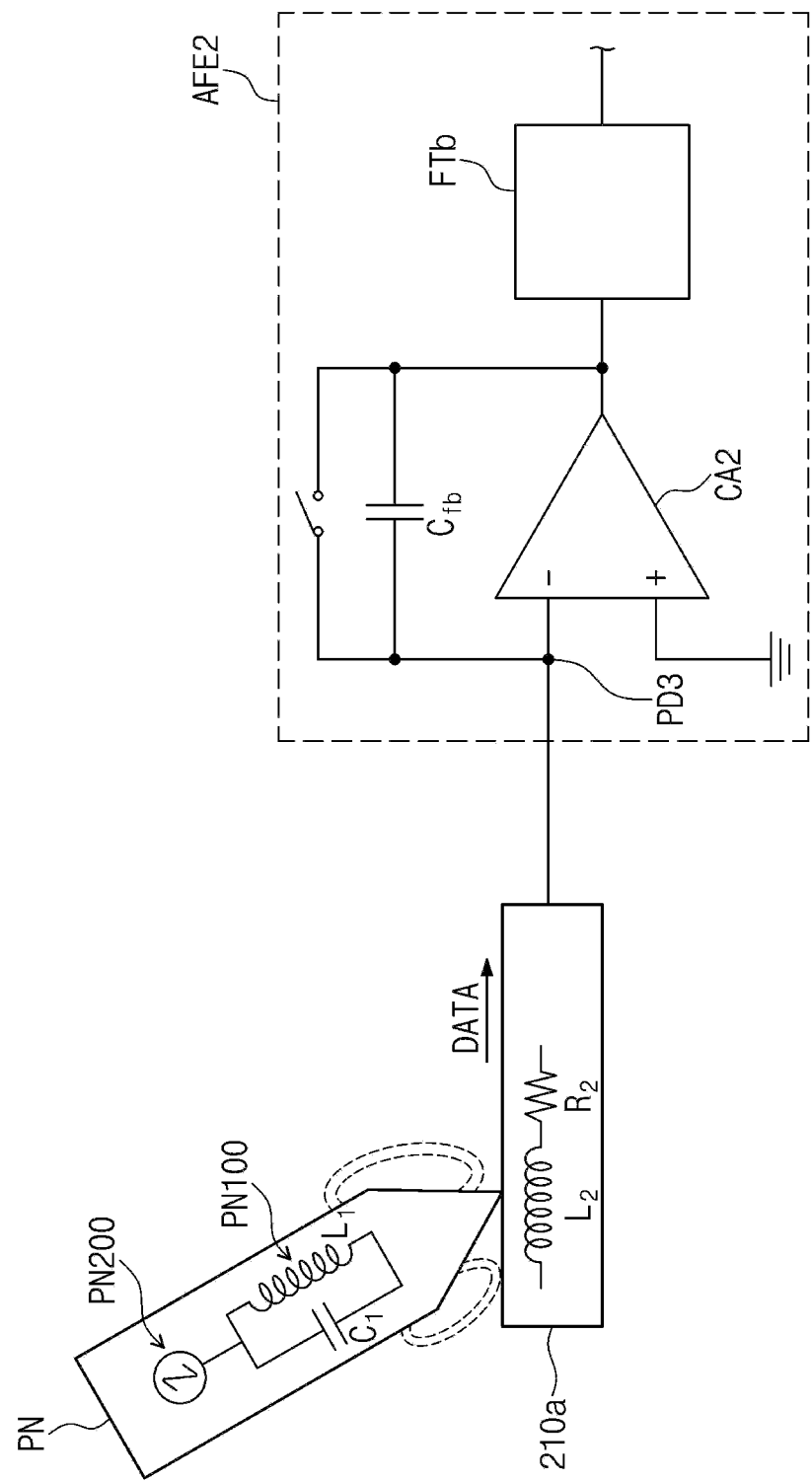
FIG. 15B is an equivalent circuit diagram illustrating an operation in a second touch mode, according to an embodiment of the present disclosure.

FIG. 14 is a block diagram illustrating a sensor layer and a driving circuit, according to an embodiment of the present disclosure. FIG. 15A is an equivalent circuit diagram illustrating an operation in a first touch mode, according to an embodiment of the present disclosure. FIG. 15B is an equivalent circuit diagram illustrating an operation in a second touch mode, according to an embodiment of the present disclosure.

Referring to FIGS. 14 to 15B, a driving circuit T-IC1 and the sensor layer ISL may operate in the first touch mode for sensing a user touch, or the second touch mode for sensing the input by the input device PN.

The driving circuit T-IC1 may include a first analog front end unit (e.g., a first analog front end circuit) AFE1, a second analog front end unit (e.g., a second analog front end circuit) AFE2, a switching unit (e.g., a switching circuit) CTR, and the control unit CC.

The driving circuit T-IC1 may control the sensor layer ISL to alternately and repeatedly operate in the first touch mode and the second touch mode. As another example, the driving circuit T-IC1 may be switched to be in the second touch mode, when a signal (e.g., a predetermined or specific signal) is received from the input device PN while operating in the first touch mode. However, the operating manner of the driving circuit T-IC1 is not limited to the above-described examples.

The first touch mode may be a mode to receive a first input signal, and the second touch mode may be a mode to receive a second input signal. The switching unit CTR may select one of the first analog front end unit AFE1 or the second analog front end unit AFE2.

The first analog front end unit AFE1 may receive the first input signal in the first touch mode. The first analog front end unit AFE1 may include an amp unit (e.g., an amplifier) CA1 and a filter unit (e.g., a filter) FTa.

The driving circuit T-IC1 may transmit a detecting signal TXS to the electrodes 210, and may receive a sensing signal RXS from the crossing electrodes 220. When a touch event occurs, a change occurs in a mutual capacitance Cm defined between an electrode 210x and a crossing electrode 220x at a relevant point. As the touch event occurs, a capacitor (hereinafter, referred to as a touch capacitor) is formed between opposite terminals of the mutual capacitor Cm. The touch capacitor may include two capacitors Cft and Cfr connected to each other in series.

One capacitor Cft of the touch capacitors Cft and Cfr is formed between the electrode 210x, which is to receive the detecting signal TXS, and an input unit (e.g., a finger). Another capacitor Cfr of the touch capacitors Cft and Cfr is formed between the crossing electrode 220x and the input unit.

The driving circuit T-IC1 may read the sensing signal RXS out of the crossing electrode 220x. The sensing signal RXS may be provided to the filter unit FTa having a first bandwidth. A change amount ΔCm of a capacitance, which is made before and after an input is made, may be measured. The change amount ΔCm of the capacitance may be measured by sensing a current change of the sensing signal RXS.

FIG. 15A illustrates equivalent resistors Rf1, Rf2, and Rf3, which are formed by the input unit, and a capacitor Cf formed between the input unit and a ground surface. An equivalent resistor Rtx is shown between a pad PD1, which receives the detecting signal TXS, of the pads PD and a point, which has a touch event occurring therein, of the electrode 210x. An equivalent resistor Rrx is shown between a pad PD2, which is to output the sensing signal RXS, of the pads PD and a point, which has a touch event occurring therein, of the crossing electrode 220x.

The second analog front end unit AFE2 may receive the second input signal in the second touch mode. The second analog front end unit AFE2 may include an amp unit (e.g., an amplifier) CA2 and a filter unit (e.g., a filter) FTb.

The driving circuit T-IC1 may receive a sensed signal caused by the input device PN from at least one of the electrodes 210 and the crossing electrodes 220. Although FIG. 15B illustrates that the input by the input device PN is sensed through an electrode 210a of the electrodes 210, the present disclosure is not limited thereto.

The inverting input terminal of the amp unit CA2 may be electrically connected to the electrode 210a. A reference potential may be provided to the non-inverting input terminal of the amp unit CA2. A capacitor Cfb may be connected between the inverting input terminal of the amp unit CA2 and an output terminal of the amp unit CA2.

When the input device PN approaches, an inductive current may be applied to the electrode 210a by a magnetic field (B-field) output from the input device PN. The second input signal DATA may be received through the inductive current. An inductor L2 may be a parasitic inductor generated in the electrode 210a. A resistor R2 may be interposed between a point, which has a touch event occurring therein, of the electrode 210a and a pad PD3, which is to output an inductive current, of the pads PD. The capacitor Cfb may receive an inductive current, and may output a voltage signal based on the inductive current. The second input signal DATA may be provided to the filter unit FTb having a second bandwidth different from the first bandwidth.

According to one or more embodiments of the present disclosure, the driving circuit T-IC1 may include a plurality of analog front end units (e.g., a plurality of analog front end circuits) AFE1 and AFE2. The switching unit CTR of the driving circuit T-IC1 may select the analog front end unit from among the plurality of analog front end units AFE1 and AFE2 that is appropriate for the first touch mode or the second touch mode. The driving circuit T-IC1 may select the first analog front end unit AFE1 that is appropriate for the first input signal, or the second analog front end unit AFE2 that is appropriate for the second input signal. The driving circuit T-IC1 may efficiently process a signal by specifying a frequency, depending on the touch modes. Accordingly, the electronic device ED (e.g., see FIG. 1A) having improved reliability may be provided.

Figure 16:
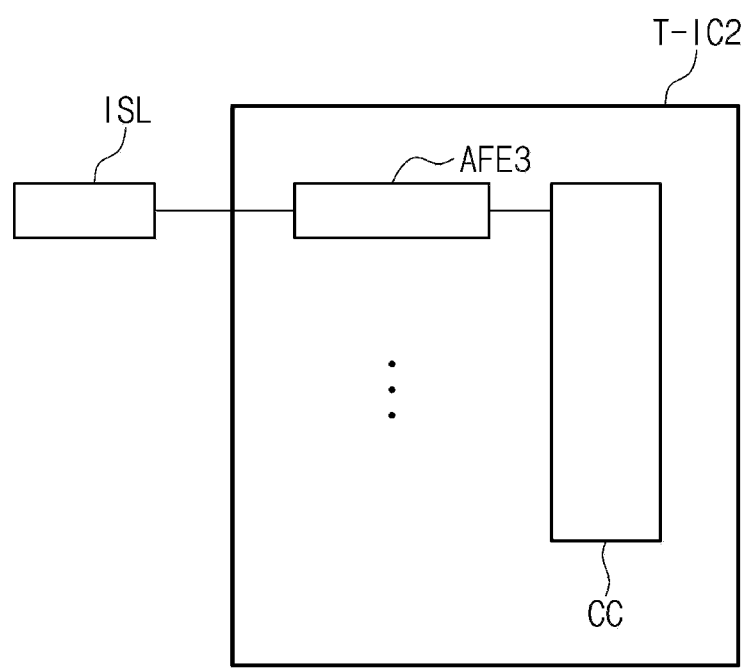
FIG. 16 is a block diagram illustrating a sensor layer and a driving circuit, according to an embodiment of the present disclosure.

FIG. 16 is a block diagram illustrating a sensor layer and a driving circuit, according to an embodiment of the present disclosure.

Referring to FIG. 16, a driving circuit T-IC2 may include a plurality of analog front end units (e.g., a plurality of analog front end circuits) AFE3, and the control unit CC.

The driving circuit T-IC2 may control the sensor layer ISL to alternately and repeatedly operate in the first touch mode and the second touch mode. As another example, the driving circuit T-IC2 may be switched to be in the second touch mode, when a signal (e.g., a predetermined or specific signal) is received from the input device PN while operating in the first touch mode. However, the operating manner of the driving circuit T-IC2 is not limited to the above-described examples.

The analog front end unit AFE3 may receive a first input signal in the first touch mode, and a second input signal in the second touch mode. The analog front end unit AFE3 may include a filter unit (e.g., a filter) having a suitable bandwidth (e.g., a specific bandwidth). The filter unit may remove noise from each of the first input signal and the second input signal.

According to one or more embodiments of the present disclosure, the analog front end unit AFE3 of the driving circuit T-IC2 may process both the first input signal and the second input signal. The number of circuits included in the driving circuit T-IC2 may be reduced. A region occupied by the driving circuit T-IC2 in the flexible circuit film FCB (e.g., see FIG. 2) may be reduced. Accordingly, the electronic device ED (e.g., see FIG. 1A) having an area reduced in the non-display region DP-NDA may be provided.

Figure 17:
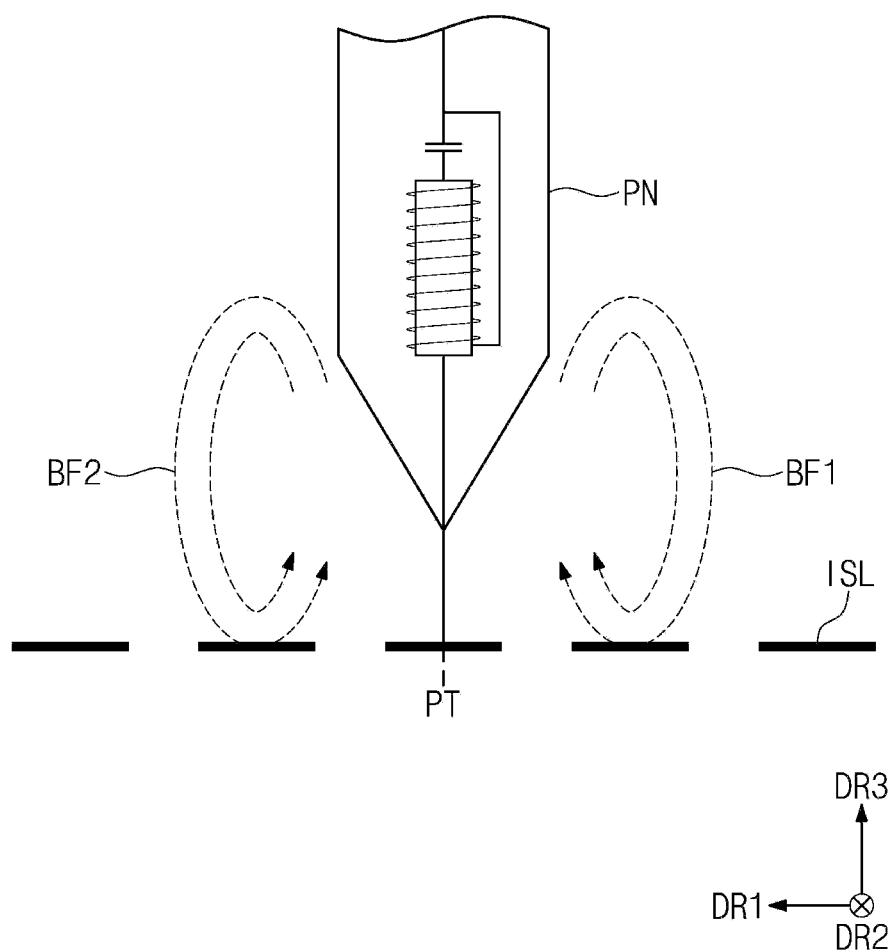
FIG. 17 is a side view illustrating an input device and a sensor layer, according to an embodiment of the present disclosure.
Figure 18:
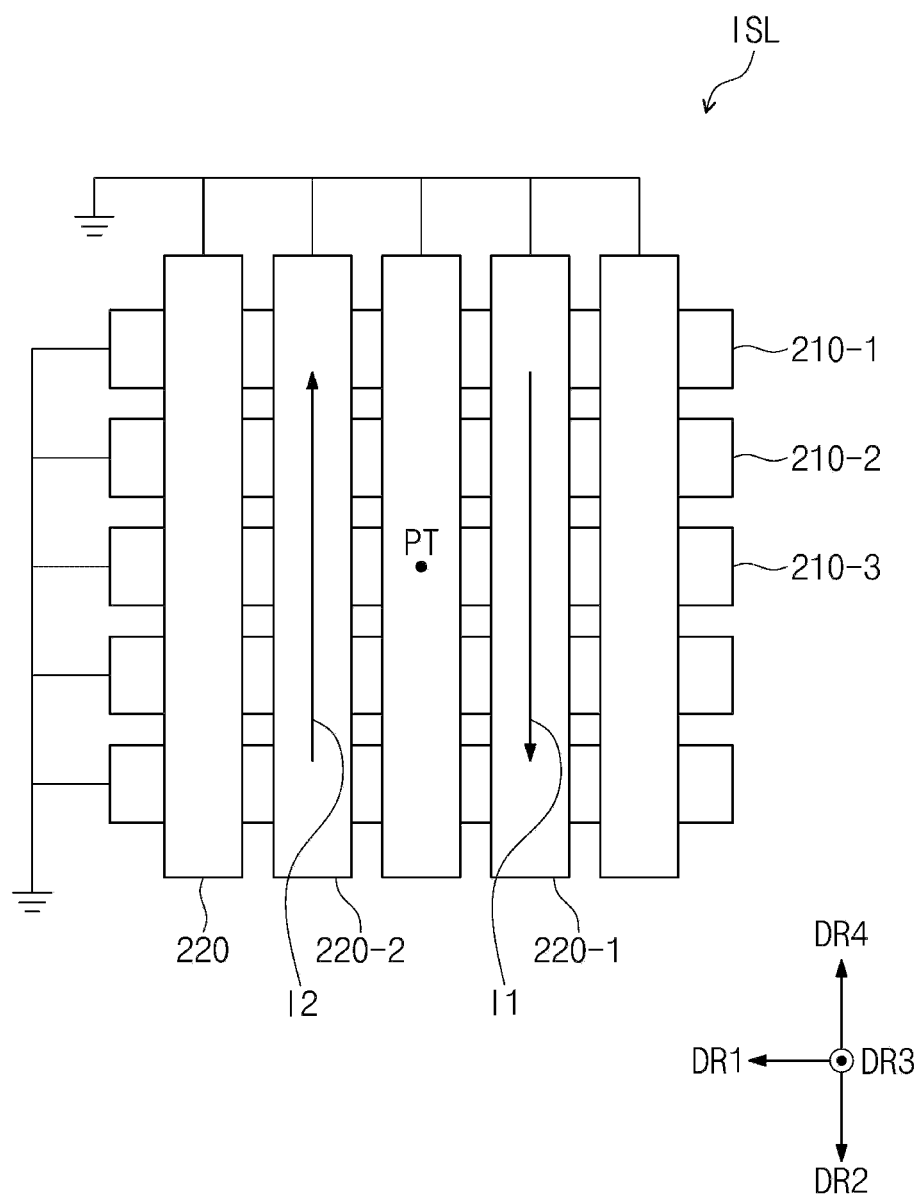
FIG. 18 is a plan view of a sensor layer, according to an embodiment of the present disclosure.
Figure 19A:
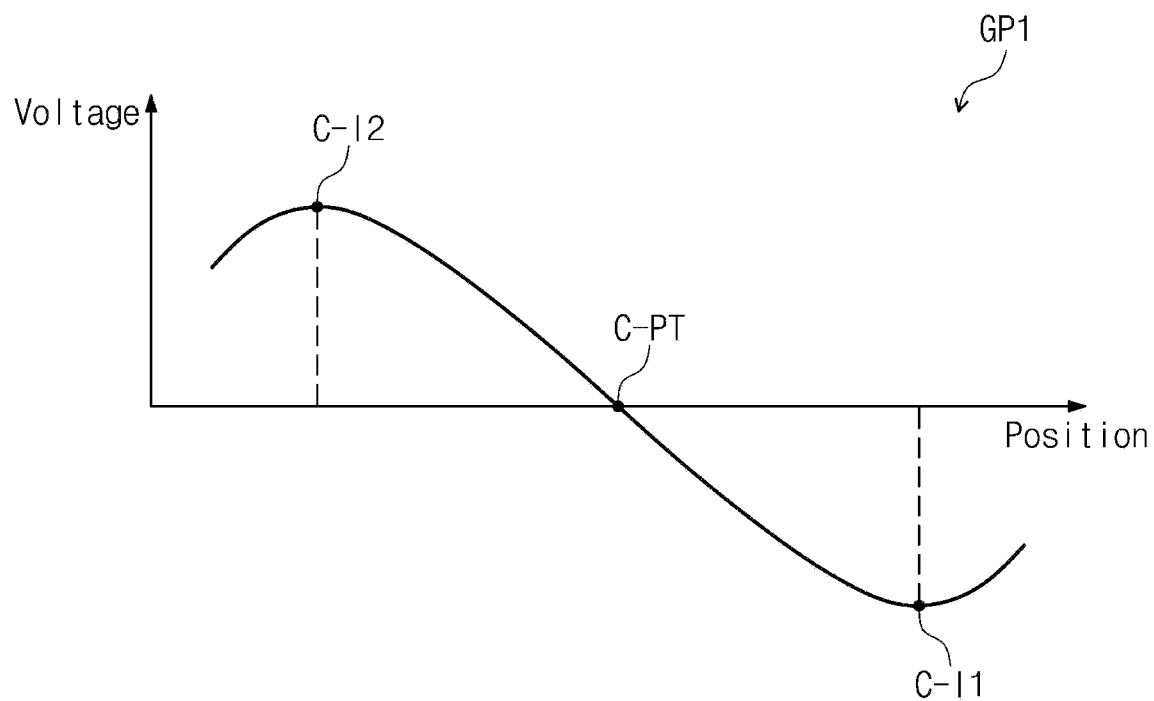
FIG. 19A is a graph illustrating a second input signal, according to an embodiment of the present disclosure.

FIG. 17 is a side view illustrating an input device and a sensor layer, according to an embodiment of the present disclosure. FIG. 18 is a plan view illustrating a sensor layer, according to an embodiment of the present disclosure. FIG. 19A is a graph of a second input signal, according to an embodiment of the present disclosure.

Referring to FIG. 8 and FIGS. 17 to 19A, the input device PN may be disposed on the sensor layer ISL. In this case, a meeting point between a virtual line extending in the third direction DR3 from the input device PN and the sensor layer ISL may be indicated as a point having coordinates PT. The point having the coordinates PT may be indicated as the central point of the input device PN.

The plurality of crossing electrodes 220 may include a first crossing electrode 220-1 and a second crossing electrode 220-2 spaced apart from each other, while the point having the coordinates PT is interposed between the first crossing electrode 220-1 and the second crossing electrode 220-2. The first crossing electrode 220-1 and the second crossing electrode 220-2 may be adjacent to each other.

Induced electromotive force may be generated in the first crossing electrode 220-1 by a magnetic field BF1 positioned at the right side of FIG. 17. A first current I1 flowing in the second direction DR2 may be formed in the first crossing electrode 220-1 through the induced electromotive force.

Induced electromotive force may be generated in the second crossing electrode 220-2 by a magnetic field BF2 positioned at the left side of FIG. 17. A second current I2 flowing in a direction DR4 opposite to the second direction DR2 may be formed in the second crossing electrode 220-2 through the induced electromotive force.

Voltage values sensed through the plurality of crossing electrodes 220 may form a signal profile GP1. The driving circuit T-IC may sense the coordinates of the input device PN, based on the signal profile GP1 measured based on the first current I1 and the second current I2.

In the signal profile GP1, the horizontal axis may indicate the position of the crossing electrode 220, and the vertical axis may indicate a voltage. For example, the coordinates PT in the signal profile GP1 may have the value of '0'. Although FIG. 18 illustrates that the signal profile GP1 is measured through the plurality of crossing electrodes 220, a target for measuring the signal profile is not limited to the plurality of crossing electrodes 220. For example, the signal profile GP1 may be measured by using the plurality of electrodes 210 (e.g., see FIG. 5B).

In the signal profile GP1, the first current I1 may have a negative value C-I1, and the second current I2 may have a positive value C-I2.

The driving circuit T-IC may calculate the coordinates PT of the input device PN based on a zero-crossing value C-PT in the signal profile GP1. For example, the driving circuit T-IC may calculate first coordinates of the input device PN on an axis extending in the first direction DR1, based on the zero-crossing value of the signal profile, which is measured by the plurality of crossing electrodes 220. The driving circuit T-IC may calculate second coordinates of the input device PN on an axis extending in the second direction DR2, based on the zero-crossing value of the signal profile, which is measured by the plurality of crossing electrodes 210. The driving circuit T-IC may calculate the coordinates PT of the input device PN by combining the first coordinates and the second coordinates with each other.

According to one or more embodiments of the present disclosure, the driving circuit T-IC may receive the second input signal DATA based on the magnetic field from the input device PN. The driving circuit T-IC may calculate the signal profile GP1 based on the second input signal DATA. The driving circuit T-IC may calculate the coordinates PT of the input device PN based on the zero-crossing value C-PT in the signal profile GP1. The driving circuit T-IC may calculate (e.g., may easily calculate) the coordinates PT of the input device PN. Accordingly, the electronic device ED (e.g., see FIG. 1A) having improved reliability may be provided.

Figure 19B:
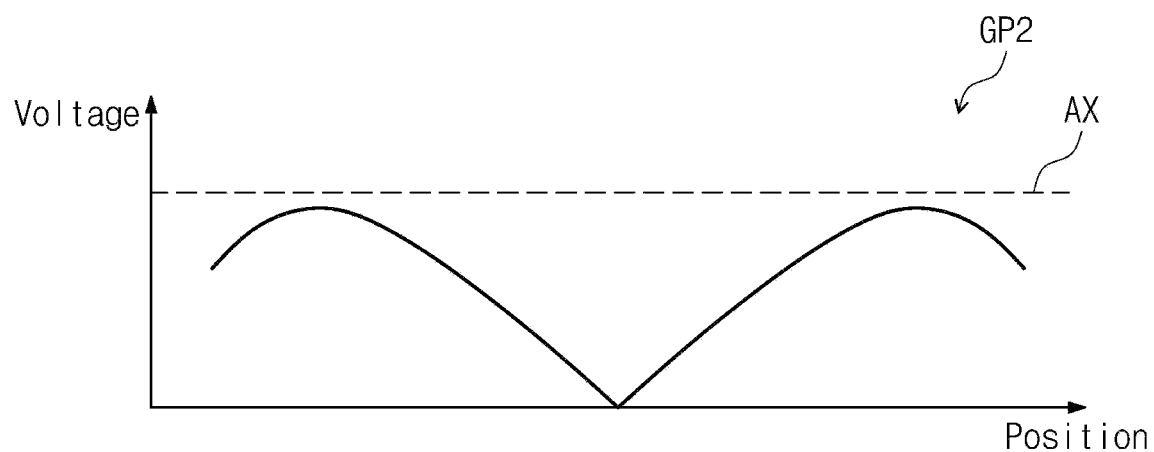
FIG. 19B is a graph illustrating a second input signal, according to an embodiment of the present disclosure.
Figure 19C:
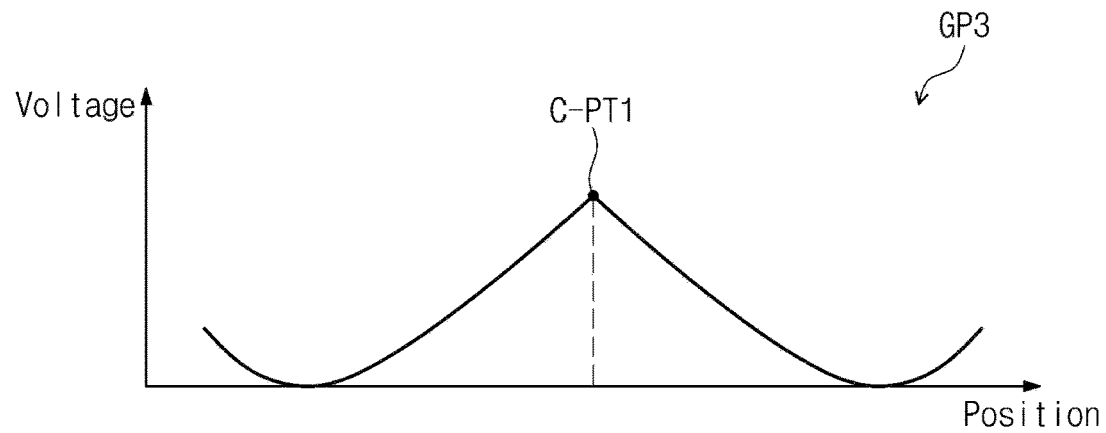
FIG. 19C is a graph illustrating a second input signal, according to an embodiment of the present disclosure.

FIGS. 19B and 19C are graphs of a second input signal, according to one or more embodiments of the present disclosure.

Referring to FIG. 8 and FIGS. 17 to 19C, the driving circuit T-IC may calculate a first signal profile GP2 by converting signs of some components of the signal profile GP1. The driving circuit T-IC may change a positive number in the signal profile GP1 into a negative number, or may change a negative number in the signal profile GP1 into a positive number. For example, the first signal profile GP2 may be formed by changing the negative number in the signal profile GP1 into the positive number, and may be formed to have components having values that are equal to or substantially equal to absolute values of the components in the signal profile GP1.

The driving circuit T-IC may calculate a second profile GP3 by rotating the first signal profile GP2, such that the second profile GP3 is symmetrical or substantially symmetrical to the first signal profile GP2 about a first axis AX.

The driving circuit T-IC may calculate the coordinates PT of the input device PN based on a peak value C-PT1 of the second signal profile GP3.

Figure 19D:
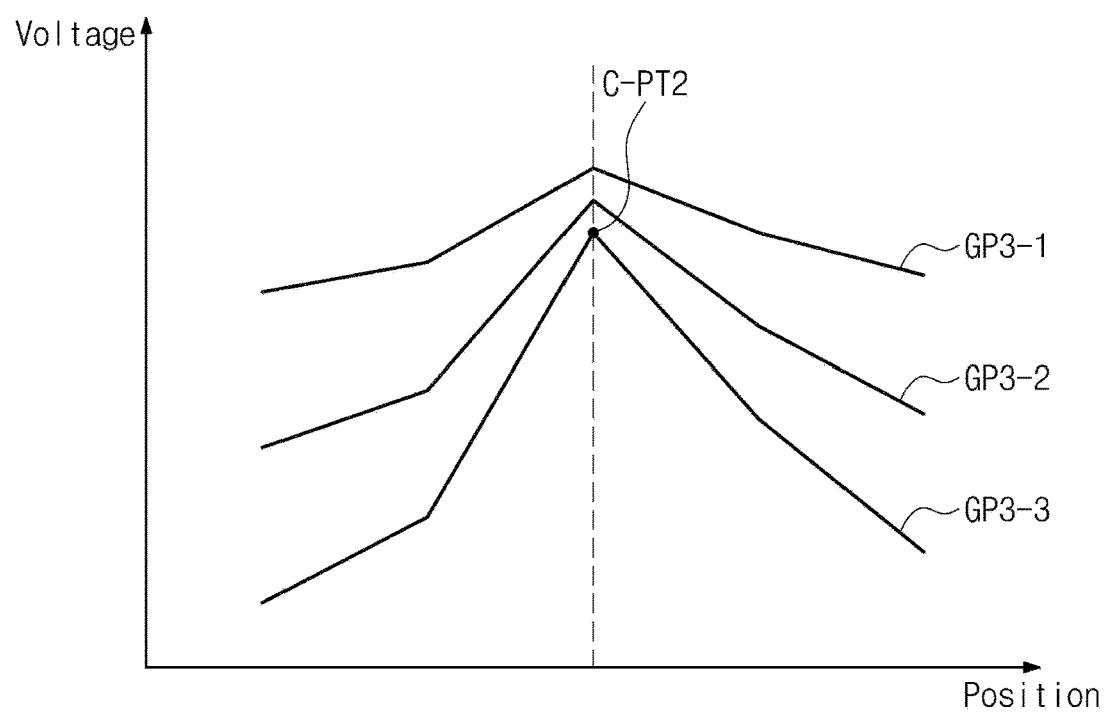
FIG. 19D is a graph illustrating a second input signal, according to an embodiment of the present disclosure.

FIG. 19D is a graph of a second input signal, according to an embodiment of the present disclosure.

Referring to FIG. 8 and FIGS. 17 to 19D, the driving circuit T-IC may calculate a plurality of signal profiles GP1.

The driving circuit T-IC may calculate superimposed signal profiles GP3-1, GP3-2, and GP3-3 based on data obtained by adding the plurality of signal profiles GP1.

The driving circuit T-IC may calculate a first superimposed signal profile by converting a sign of a portion of data obtained by adding the plurality of signal profiles GP1. The driving circuit T-IC may convert negative data of the data into positive data.

The driving circuit T-IC may calculate a second superimposed signal profile by rotating the first superimposed signal profile, such that the second superimposed signal profile is symmetrical or substantially symmetrical to the first superimposed signal profile about the first axis AX.

The driving circuit T-IC may calculate the coordinates PT of the input device PN based on a peak value C-PT2 of the second superimposed signal profile FIG. 19D illustrates a third signal profile GP3-1, a fourth signal profile GP3-2, and a fifth signal profile GP3-3.

The third signal profile GP3-1 is a graph calculated based on a value obtained by adding two signal profiles GP1.

The fourth signal profile GP3-2 is a graph calculated based on a value obtained by adding three signal profiles GP1.

The fifth signal profile GP3-3 is a graph calculated based on a value obtained by adding four signal profiles GP1.

In other words, as the number of signal profiles GP1 to be added is increased, the peak value C-PT2 of the signal profile may be calculated (e.g., may be easily calculated), and the signal-to-noise ratio may be increased. According to one or more embodiments of the present disclosure, when the coordinates PT are calculated based on a superimposed signal profile obtained by adding the plurality of signal profiles GP1, a higher signal-to-noise ratio may be ensured. Accordingly, the electronic device ED (e.g., see FIG. 1A) having improved accuracy in detecting coordinates may be provided.

Figure 20A:
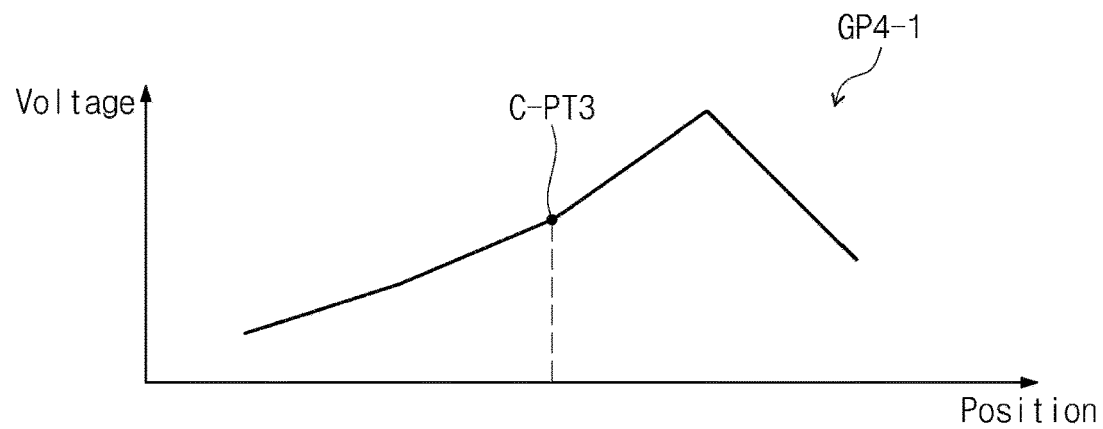
FIGS. 20A-20B are graphs of a second input signal, according to one or more embodiments of the present disclosure.
Figure 20B:
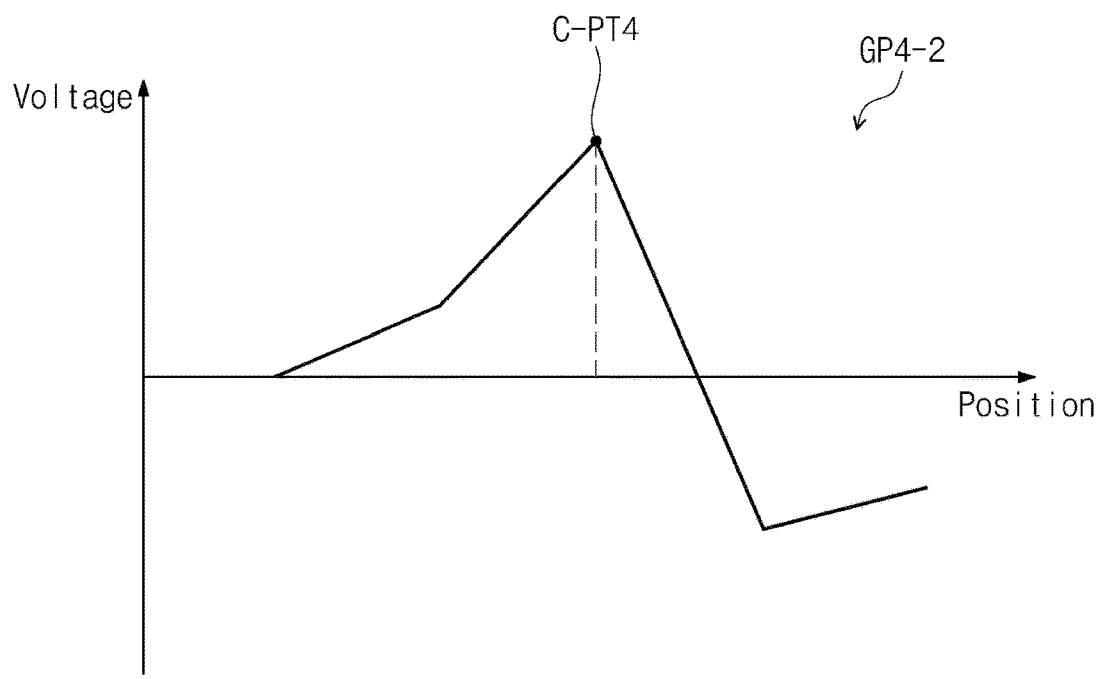

FIGS. 20A and 20B are graphs of a second input signal, according to one or more embodiments of the present disclosure.

Referring to FIGS. 12, 18, 20A, and 20B, the plurality of electrodes 210 may include first to third electrodes 210-1, 210-2, and 210-3. The second electrode 210-2 may be adjacent to the first electrode 210-1. The third electrode 210-3 may be spaced apart from the first electrode 210-1, while the second electrode 210-2 is interposed between the third electrode 210-3 and the first electrode 210-1. The third electrode 210-3 may be adjacent to the second electrode 210-2. In this case, an additional electrode may not be interposed between the first electrode 210-1 and the second electrode 210-2 which are adjacent to each other. The second electrode 210-2 may be interposed between the first electrode 210-1 and the third electrode 210-3 which are close to each other.

The second electrode 210-2 may be electrically connected to the inverting input terminal of the amp unit CAa. The third electrode 210-3 may be electrically connected to the non-inverting input terminal of the amp unit CAa. In other words, electrodes that are adjacent to each other may be electrically connected to the amp unit CAa. The driving circuit T-IC may calculate a first differential signal profile GP4-1 based on the electrodes that are adjacent to each other.

In the first differential signal profile GP4-1, the horizontal axis may indicate the position of the electrode 210, and the vertical axis may indicate a voltage. The driving circuit T-IC may move the graph of the first differential signal profile GP4-1 in parallel. The driving circuit T-IC may calculate the coordinates PT of the input device PN, based on a zero-crossing value C-PT3 in the first differential signal profile GP4-1.

As another example, the driving circuit T-IC may change a sign of a part of the first differential signal profile GP4-1, and then move the first differential signal profile GP4-1 in parallel to calculate a second differential signal profile GP4-2. The driving circuit T-IC may calculate the coordinates PT of the input device PN based on a peak value C-PT4 of the second differential signal profile GP4-2.

The driving circuit T-IC may calculate the coordinate PT of the input device PN using a zero-crossing value for adjacent electrodes, or may convert a signal profile to calculate the coordinates PT of the input device PN using a peak value.

Although FIGS. 20A and 20B illustrate that coordinates of the second input signal of the plurality of electrodes 210 are calculated, the driving circuit T-IC may calculate the coordinates PT of the input device PN in the same or substantially the same manner, even in the plurality of crossing electrodes 220.

Figure 20C:
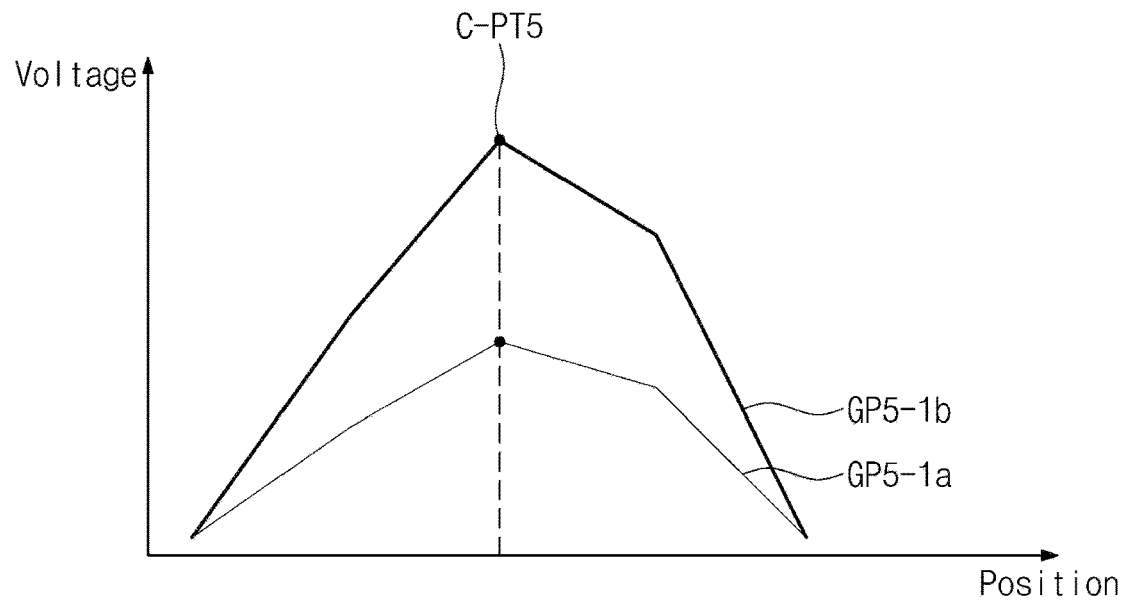
FIGS. 20C-20D are graphs of a second input signal, according to one or more embodiments of the present disclosure.
Figure 20D:
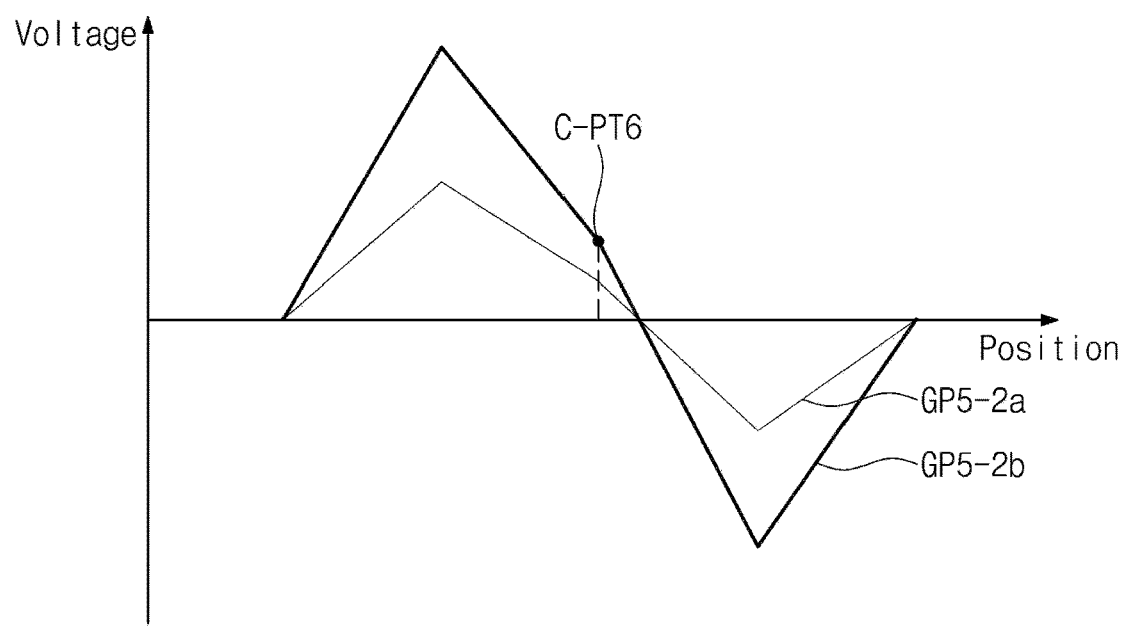

FIGS. 20C and 20D are graphs of a second input signal, according to one or more embodiments of the present disclosure.

Referring to FIGS. 12, 18, 20C, and 20D, the first electrode 210-1 may be electrically connected to the inverting input terminal of the amp unit CAa. The third electrode 210-3 may be electrically connected to the non-inverting input terminal of the amp unit CAa. In other words, elec-trodes that are adjacent to each other may be electrically connected to the amp unit CAa. The driving circuit T-IC may calculate a third differential signal profile GP5-1a based on the electrodes that are adjacent to each other.

The driving circuit T-IC may calculate the coordinates PT of the input device PN, based on a peak value of the third differential signal profile GP5-1a.

The driving circuit T-IC may calculate superimposed signal profiles GP5-1b, based on data obtained by adding a plurality of third differential signal profiles GP5-1a. The driving circuit T-IC may calculate the coordinates PT of the input device PN based on a peak value C-PT5 of the superimposed signal profiles GP5-1b.

According to one or more embodiments of the present disclosure, as the number of third differential signal profiles GP5-1a to be added is increased, the peak value C-PT5 of the superimposed signal profile GP5-1b may be calculated (e.g., may be easily calculated), and the signal-to-noise ratio may be increased. Accordingly, the electronic device ED (e.g., see FIG. 1A) having improved accuracy in detecting coordinates may be provided.

As another example, the driving circuit T-IC may convert a sign of a portion of the third differential signal profile GP5-1a, and then move the third differential signal profile GP5-1a in parallel, to calculate a fourth differential signal profile GP5-2a. The driving circuit T-IC may calculate the coordinates PT of the input device PN, based on a zero-crossing value of the fourth differential signal profile GP5-2a.

The driving circuit T-IC may calculate the coordinate PT of the input device PN using a peak value with respect to a closer electrode, or may convert a signal profile to calculate the coordinate PT of the input device PN using a zero-crossing value.

The driving circuit T-IC may calculate a superimposed signal profile GP5-2b, based on data obtained by adding a plurality of fourth differential signal profiles GP5-2a. The driving circuit T-IC may calculate the coordinates PT of the input device PN, based on a peak value C-PT6 in the superimposed signal profiles GP5-2b.

According to one or more embodiments of the present disclosure, as the number of fourth differential signal profiles GP5-2a to be added is increased, the peak value C-PT6 of the superimposed signal profile GP5-2b may be calculated (e.g., may be easily calculated), and the signal-to-noise ratio may be increased. Accordingly, the electronic device ED (e.g., see FIG. 1A) having improved reliability may be provided.

According to one or more embodiments of the present disclosure, the coordinates PT of the input device PN may be calculated through a zero-crossing method, or a negative number changing method. As the driving circuit T-IC employs various suitable methods for calculating coordinates depending on situations, the electronic device ED (e.g., see FIG. 1A) having improved accuracy may be provided.

As described above, according to one or more embodiments of the present disclosure, the position signal of the input signal received from the input device may be synchronized by the sync control unit of the driving circuit. As the position signal is synchronized, the input signal may be synchronized. In other words, the data signal of the input signal may be synchronized. The electronic device may precisely receive tilt information, input information, and button information received from the input device. The accuracy of the data signal may be improved. Accordingly, the electronic device having improved reliability may be provided.

In addition, as described above, according to one or more embodiments of the present disclosure, the driving circuit may receive the input signal based on the magnetic field from the input device. The driving circuit may calculate the coordinates of the input device through the zero-crossing method, or the negative changing method. As the driving circuit employs the appropriate coordinate calculating method depending on the situation, the electronic device having improved accuracy may be provided.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:
    a display layer;
    a sensor layer on the display layer, and comprising:
        a plurality of electrodes comprising a first electrode, and a second electrode adjacent to the first electrode; and
        a plurality of crossing electrodes; and
    a driving circuit electrically connected to the sensor layer, and configured to control an operation of the sensor layer,
    wherein the sensor layer is configured to operate in a first touch mode to sense a first input signal based on a capacitance change, and a second touch mode to sense a second input signal of an input device configured to discharge a magnetic field, and
    wherein the driving circuit is configured to sense coordinates of the input device based on a signal profile, the signal profile being measured based on a first current having a first current direction formed in the first electrode by the magnetic field of the input device, and a second current having a second current direction opposite to the first current direction formed in the second electrode by the magnetic field of the input device.

2. The electronic device of claim 1, wherein the driving circuit comprises an analog front end comprising:
    an amplifier configured to amplify the first input signal and the second input signal; and
    a filter configured to remove noise from a signal output from the amplifier.

3. The electronic device of claim 2, wherein the analog front end further comprises:
    a sample and hold circuit configured to perform a sample and hold operation on a signal output from the filter.

4. The electronic device of claim 2, wherein the amplifier comprises:
    an inverting input terminal connected to the first electrode; and
    a non-inverting input terminal connected to the second electrode.

5. The electronic device of claim 2, wherein the amplifier comprises:
    an inverting input terminal connected to the first electrode; and
    a non-inverting input terminal connected to a reference potential.

6. The electronic device of claim 2, wherein the second input signal comprises a position signal and a data signal,
    wherein the driving circuit further comprises a sync controller connected to the analog front end, and
    wherein the sync controller comprises:
        a sync data providing circuit configured to provide a sync signal that is inverted to the position signal;
        an XOR gate connected to the analog front end and the sync data providing circuit, the XOR gate being configured to perform a XOR operation based on the position signal and the sync signal; and
        a sync determining circuit configured to determine a synchronization state of the second input signal, based on a result of the XOR operation.

7. The electronic device of claim 1, wherein the driving circuit comprises:
    a first analog front end configured to receive the first input signal;
    a second analog front end configured to receive the second input signal; and
    a switching circuit configured to select one of the first analog front end and the second analog front end.

8. The electronic device of claim 1, wherein the first current in the signal profile has a negative value, and the second current in the signal profile has a positive value, and
    wherein the driving circuit is configured to calculate the coordinates of the input device based on a zero-crossing value of the signal profile.

9. The electronic device of claim 1, wherein the driving circuit is configured to:
    calculate a first signal profile by changing a sign of a portion of the signal profile;
    calculate a second signal profile by rotating the first signal profile, such that the second signal profile is symmetrical to the first signal profile about a first axis; and
    calculate the coordinates of the input device, based on a peak value of the second signal profile.

10. The electronic device of claim 9, wherein the driving circuit is configured to:
    calculate a plurality of signal profiles;
    calculate a superimposed signal profile by adding the plurality of signal profiles;
    change a sign in the superimposed signal profile; and
    calculate the coordinates of the input device, based on a peak value of a value symmetrical about the first axis.

11. The electronic device of claim 1, wherein the plurality of electrodes further comprise:
    a third electrode interposed between the first electrode and the second electrode; and
    a fourth electrode interposed between the first electrode and the third electrode, and
    wherein the driving circuit is configured to:

calculate a first differential signal profile measured based on the first electrode and the third electrode; and calculate the coordinates of the input device, based on a zero-crossing value of the first differential signal profile.

12. The electronic device of claim 11, wherein the driving circuit is configured to:

calculate a second differential signal profile by changing a sign of a portion of the first differential signal profile; and calculate the coordinates of the input device, based on a peak value of the second differential signal profile.

13. The electronic device of claim 11, wherein the driving circuit is configured to:

calculate a fourth differential signal profile measured based on the third electrode and the fourth electrode; and calculate the coordinates of the input device, based on a peak value of the fourth differential signal profile.

14. The electronic device of claim 13, wherein the driving circuit is configured to:

calculate a fifth differential signal profile by changing a sign of a portion of the fourth differential signal profile; and calculate the coordinates of the input device, based on a zero-crossing value of the fifth differential signal profile.

15. An electronic device comprising:

a display layer;

a sensor layer on the display layer, the sensor layer being configured to operate in a first touch mode to sense a first input signal based on a capacitance change, and a second touch mode to sense a second input signal of an input device configured to discharge a magnetic field; and a driving circuit electrically connected to the sensor layer to control an operation of the sensor layer, wherein the driving circuit comprises:

an analog front end configured to convert an analog signal of the second input signal into a digital signal; and a sync controller connected to the analog front end, the sync controller comprising:

a sync data providing circuit configured to provide a sync signal that is inverted to a position signal of the second input signal;

an XOR gate connected to the analog front end and the sync data providing circuit, the XOR gate configured to perform a XOR operation based on the position signal and the sync signal; and a sync determining circuit configured to determine a synchronization state of the second input signal, based on a result of the XOR operation.

16. The electronic device of claim 15, wherein the sensor layer comprises:

a plurality of electrodes comprising:

a first electrode; and a second electrode adjacent to the first electrode; and a plurality of crossing electrodes, and wherein the driving circuit is configured to sense coordinates of the input device based on a signal profile, the signal profile being measured based on a first current having a first current direction formed in the first electrode by the input device, and a second current having a second current direction opposite to the first current direction formed in the second electrode by the input device.

17. The electronic device of claim 16, wherein the first current in the signal profile has a negative value, and the second current in the signal profile has a positive value, and wherein the driving circuit is configured to calculate the coordinates of the input device, based on a zero-crossing value of the signal profile.

18. The electronic device of claim 16, wherein the driving circuit is configured to:

calculate a first signal profile by converting a sign of a portion of the signal profile;

calculate a second signal profile by rotating the first signal profile, such that the second signal profile is symmetrical to the first signal profile about a first axis; and calculate the coordinates of the input device, based on a peak value of the second signal profile.

19. The electronic device of claim 16, wherein the plurality of electrodes further comprise:

a third electrode interposed between the first electrode and the second electrode; and a fourth electrode interposed between the first electrode and the third electrode, wherein the driving circuit is configured to calculate a first differential signal profile measured based on the first electrode and the third electrode, wherein the driving circuit is configured to calculate a second differential signal profile by changing a sign of a portion of the first differential signal profile, and wherein the driving circuit is configured to calculate the coordinates of the input device, based on a zero-crossing value of the first differential signal profile, or a peak value of the second differential signal profile.

20. The electronic device of claim 16, wherein the plurality of electrodes further comprise:

a third electrode interposed between the first electrode and the second electrode, and a fourth electrode interposed between the first electrode and the third electrode, wherein the driving circuit is configured to calculate a fourth differential signal profile measured based on the third electrode and the fourth electrode, wherein the driving circuit is configured to calculate a fifth differential signal profile by changing a sign of a portion of the fourth differential signal profile, and wherein the driving circuit is configured to calculate the coordinates of the input device based on a peak value of the fourth differential signal profile, or a zero-crossing value of the fifth differential signal profile.

* * * * *